(12) United States Patent
White

(10) Patent No.: US 9,144,944 B1
(45) Date of Patent: Sep. 29, 2015

(54) ROTOR BLADE SPAR MANUFACTURING APPARATUS AND METHOD

(75) Inventor: Robert Owen White, Orillia Ontario (CA)

(73) Assignee: Groen Brothers Aviation, Inc., Salt Lake City, UT (US)

( * ) Notice: Subject to any disclaimer, the term of this patent is extended or adjusted under 35 U.S.C. 154(b) by 0 days.

(21) Appl. No.: 13/317,749

(22) Filed: Oct. 27, 2011

Related U.S. Application Data

(63) Continuation of application No. 13/199,719, filed on Sep. 7, 2011, now abandoned.

(60) Provisional application No. 61/403,098, filed on Sep. 9, 2010, provisional application No. 61/456,219, filed on Nov. 2, 2010, provisional application No. 61/460,572, filed on Jan. 3, 2011.

(51) Int. Cl.
| | |
|---|---|
| B29C 70/34 | (2006.01) |
| B64C 27/473 | (2006.01) |
| B29C 70/46 | (2006.01) |
| B29C 33/02 | (2006.01) |
| B29C 35/02 | (2006.01) |

(52) U.S. Cl.
CPC .............. *B29C 70/345* (2013.01); *B29C 33/02* (2013.01); *B29C 35/0288* (2013.01); *B29C 70/462* (2013.01); *B64C 27/473* (2013.01); *B29C 2035/0211* (2013.01); *B64C 2027/4736* (2013.01)

(58) Field of Classification Search
USPC ........ 425/419, 508, 509; 264/327, 40.1, 40.3, 264/40.5, 313, 316; 156/282, 307.1; 244/123.8, 123.9, 123.14; 700/206
See application file for complete search history.

(56) References Cited

U.S. PATENT DOCUMENTS

| | | | |
|---|---|---|---|
| 3,494,424 A | 2/1970 | Stanley | |
| 4,264,278 A * | 4/1981 | Weingart | 416/226 |
| 4,704,240 A | 11/1987 | Reavely et al. | |
| 4,889,668 A * | 12/1989 | Kemp | 264/40.5 |
| 4,976,587 A * | 12/1990 | Johnston et al. | 416/230 |
| 5,131,834 A | 7/1992 | Potter | |
| 5,145,621 A * | 9/1992 | Pratt | 264/102 |
| 5,474,425 A * | 12/1995 | Lawlor | 416/223 R |
| 5,683,646 A * | 11/1997 | Reiling, Jr. | 264/512 |
| 5,814,259 A * | 9/1998 | Weiser et al. | 264/219 |
| 6,558,590 B1 * | 5/2003 | Stewart | 264/40.5 |
| 6,659,722 B2 | 12/2003 | Sehgal et al. | |
| 2003/0116262 A1* | 6/2003 | Stiesdal et al. | 156/245 |
| 2007/0251090 A1* | 11/2007 | Breugel et al. | 29/889.7 |
| 2008/0157429 A1 | 7/2008 | Callis et al. | |

(Continued)

*Primary Examiner* — William Bell
(74) *Attorney, Agent, or Firm* — Pate Baird, PLLC

(57) ABSTRACT

Apparatus and methods are disclosed for manufacture of a composite rotor blade spar having non-uniform wall thickness. Tooling for manufacturing include a first mold defining a first mold surface and a second mold comprising a rigid layer and a heated layer secured to the rigid layer and defining a second mold surface. A plurality of heating elements embedded in the second mold are activated according to a plurality of different temperature progressions effective to cure portions of the uncured composite blade spar positioned between the first and second mold surfaces coextensive with each heating element of the plurality of heating elements. In some embodiments, the second mold defines a root portion and first and second branch portions. A shear web is placed between the first and second branch portions and is bonded to a blade spar skin surrounding the second mold during curing of the blade spar skin.

14 Claims, 29 Drawing Sheets

(56) References Cited

U.S. PATENT DOCUMENTS

| | | | |
|---|---|---|---|
| 2008/0206062 A1* | 8/2008 | Sanz Pascual et al. | 416/226 |
| 2008/0295755 A1* | 12/2008 | Weimer | 112/475.08 |
| 2009/0011063 A1* | 1/2009 | Davie et al. | 425/144 |
| 2009/0220747 A1* | 9/2009 | Karem | 428/172 |
| 2009/0229748 A1* | 9/2009 | Berchtold et al. | 156/308.2 |
| 2009/0324416 A1* | 12/2009 | Bonnet | 416/223 R |
| 2010/0181018 A1* | 7/2010 | Walczyk et al. | 156/243 |
| 2010/0266416 A1 | 10/2010 | Marshall et al. | |
| 2010/0288513 A1 | 11/2010 | Turley et al. | |

* cited by examiner

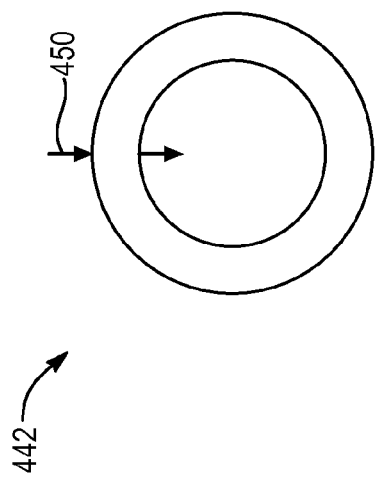
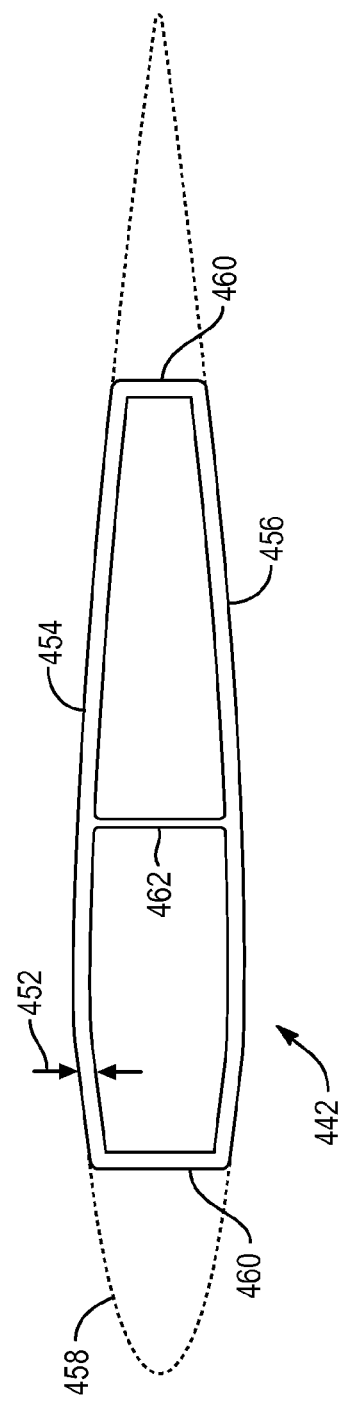

ROTOR BLADE SPAR MANUFACTURING APPARATUS AND METHOD

RELATED APPLICATIONS

This application claims the benefit of U.S. Provisional Patent Application Ser. No. 61/460,572, filed on Jan. 3, 2011, is a continuation of co-pending U.S. patent application Ser. No. 13/199,719, filed on Sep. 7, 2011, which claims the benefit of U.S. Provisional Patent Application Ser. No. 61/403,098, filed on Sep. 9, 2010, and claims the benefit of U.S. Provisional Patent Application Ser. No. 61/456,219, filed on Nov. 2, 2010, all of which are hereby incorporated by reference.

RIGHTS OF U.S. GOVERNMENT

This invention was made with Government support under Agreement No. HR0011-06-9-0002 awarded by DARPA. The Government has certain rights in the invention.

BACKGROUND

1. The Field of the Invention

This invention relates to rotating wing aircraft, and, more particularly to rotating wing aircraft relying on autorotation of a rotor to provide lift.

2. The Background Art

Rotating wing aircraft rely on a rotating wing to provide lift. In contrast, fixed wing aircraft rely on air flow over a fixed wing to provide lift. Fixed wing aircraft must therefore achieve a minimum ground velocity on takeoff before the lift on the wing is sufficient to overcome the weight of the plane. Fixed wing aircraft therefore generally require a long runway along which to accelerate to achieve this minimum velocity and takeoff.

In contrast, rotating wing aircraft can take off and land vertically or along short runways inasmuch as powered rotation of the rotating wing provides the needed lift. This makes rotating wing aircraft particularly useful for landing in urban locations or undeveloped areas without a proper runway.

The most common rotating wing aircraft in use today are helicopters. A helicopter typically includes an airframe, housing an engine and passenger compartment, and a rotor, driven by the engine, to provide lift. Forced rotation of the rotor causes a reactive torque on the airframe. Accordingly, conventional helicopters require either two counter rotating rotors or a tail rotor in order to counteract this reactive torque.

Another type of rotating wing aircraft is the autogyro. An autogyro aircraft derives lift from an unpowered, freely rotating rotor or plurality of rotary blades. The energy to rotate the rotor results from a windmill-like effect of air passing through the underside of the rotor. The forward movement of the aircraft comes in response to a thrusting engine such as a motor driven propeller mounted fore or aft.

During the developing years of aviation aircraft, autogyro aircraft were proposed to avoid the problem of aircraft stalling in flight and to reduce the need for runways. The relative airspeed of the rotating wing is independent of the forward airspeed of the autogyro, allowing slow ground speed for takeoff and landing, and safety in slow-speed flight. Engines may be tractor-mounted on the front of an autogyro or pusher-mounted on the rear of the autogyro.

Airflow passing the rotary wing, alternately called rotor blades, which are tilted upward toward the front of the autogyro, act somewhat like a windmill to provide the driving force to rotate the wing, i.e. autorotation of the rotor. The Bernoulli effect of the airflow moving over the rotor surface creates lift.

Various autogyro devices in the past have provided some means to begin rotation of the rotor prior to takeoff, thus further minimizing the takeoff distance down a runway. One type of autogyro is the "gyrodyne," which includes a gyrodyne built by Fairey aviation in 1962 and the XV-1 convertiplane first flight tested in 1954. The gyrodyne includes a thrust source providing thrust in a flight direction and a large rotor for providing autorotating lift at cruising speeds. To provide initial rotation of the rotor, jet engines were secured to the tip of each blade of the rotor and powered during takeoff, landing, and hovering.

Although rotating wing aircraft provide the significant advantage of vertical takeoff and landing (VTOL), they are much more limited in their maximum flight speed than are fixed wing aircraft. The primary reason that prior rotating wing aircraft are unable to achieve high flight speed is a phenomenon known as "retreating blade stall." As the airframe of the rotating wing aircraft moves in a flight direction, rotation of the rotor causes each blade thereof to be either "advancing" or "retreating."

That is, in a fixed-wing aircraft, all wings move forward in fixed relation, with the airframe. In a rotary-wing aircraft, the airframe moves forward with respect to the air. However, rotor blades on both sides move with respect to the airframe. Thus, the velocity of any point on any blade is the velocity of that point, with respect to the airframe, plus the velocity of the airframe. A blade is advancing if it is moving in the same direction as the flight direction. A blade is retreating if it is moving opposite the flight direction.

The rotor blades are airfoils that provide lift that depends on the speed of air flow thereover. The advancing blade therefore experiences much greater lift than the retreating blade. One technical solutions to this problem is that the blades of the rotors are allowed to "flap." That is, the advancing blade is allowed to fly or flap upward in response to the increased air speed thereover such that its blade angle of attack is reduced. This reduces the lift exerted on the blade. The retreating blade experiences less air speed and tends to fly or flap downward such that its blade angle of attack is increased, which increases the lift exerted on the blade.

Flap enables rotating wing aircraft to travel in a direction perpendicular to the axis of rotation of the rotor. However, lift equalization due to flapping is limited by a phenomenon known as "retreating blade stall." As noted above, flapping of the rotor blades increases the angle of attack of the retreating blade. However, at certain higher speeds, the increase in the blade angle of attack required to equalize lift on the advancing and retreating blades results in loss of lift (stalling) of the retreating blade.

A second limit on the speed of rotating wing aircraft is the drag at the tips of the rotor. The tip of the advancing blade is moving at a speed equal to the speed of the aircraft and relative to the air, plus the speed of the tip of the blade with respect to the aircraft. That is equal to the sum of the flight speed of the rotating wing aircraft plus the product of the length of the blade and the angular velocity of the rotor. In helicopters, the rotor is forced to rotate in order to provide both upward lift and thrust in the direction of flight. Increasing the speed of a helicopter therefore increases the air speed at the rotor or blade tip, both because of the increased flight speed and the increased angular velocity of the rotors required to provide supporting thrust.

The air speed over the tip of the advancing blade can therefore exceed the speed of sound even though the flight speed is actually much less. As the air speed over the tip approaches the speed of sound, the drag on the blade becomes greater than the engine can overcome. In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotating wing aircraft is reverse air flow over the retreating blade. As noted above, the retreating blade is traveling opposite the flight direction with respect to the airframe. At certain high speeds, portions of the retreating blade are moving rearward, with respect to the airframe, slower than the flight speed of the airframe. Accordingly, the direction of air flow over these portions of the retreating blade is reversed from that typically designed to generate positive lift. Air flow may instead generate a negative lift, or downward force, on the retreating blade. For example, if the blade angle of attack is upward with respect to wind velocity, but wind is moving over the wing in a reverse direction, the blade may experience negative lift.

The ratio of the maximum air speed of a rotating wing aircraft to the maximum air speed of the tips of the rotor blades is known as the "advance ratio. The maximum advance ratio of rotary wing aircraft available today is less than 0.5, which generally limits the top flight speed of rotary wing aircraft to less than 200 miles per hour (mph). For most helicopters, that maximum achievable advance ratio is between about 0.3 and 0.4.

At high speeds and high advance ratios, the flapping loads, lead-lag loads, and other loads exerted on the blades of a rotorcraft can be very large. The vibrational modes of the blade can also be complex and coincide with frequencies in the range of cyclic loading of the blades. Composite materials, such as carbon fiber, advantageously provide very high strength and stiffness and lightness of weight. However, conventional composite manufacturing methods are not suitable for achieving the complex geometry of rotor blade having the needed flexural and vibrational properties.

Composite materials typically include a high strength fiber, such as fiberglass or carbon fiber, embedded within a polymeric matrix material. The composition of composite materials from fiber and a polymeric matrix enables the formation of complex shapes using plies of fiber and resin applied to a mold or mandrel. The plies may be applied to the mold along with a semi-liquid resin or may be pre-pregnated with a resin that solidifies around the fiber prior to applying the plies to the mold. Pre-impregnated ("pre-preg") plies may then be subsequently cured in order to first melt the resin and then cause the resin to cross-link and become rigid.

Composite materials, particularly carbon fiber composites, have very high strength due to the inherent properties of the carbon fiber. For this reason carbon fiber composites have come to replace steel and aluminum in many aeronautical applications due to their high strength to weight ratio. However, prior manufacturing processes for making composite parts are limited as to the complexity of the parts that may be manufactured. The curing process of parts made of pre-preg plies requires the application of appropriate amounts of heat and pressure to the assembled plies. If too little heat and/or pressure is applied, the resin will not adequately cross link and the plies of carbon fiber will not adhere to one another properly. If too much heat is applied or heat is applied for too long, the resin will over-cure and begin to degrade.

In prior processes, a part made of multiple pre-preg plies is cured by applying multiple plies or mats of pre-preg carbon fiber to a mold. The plies are then compressed by inserting them within a vacuum bag or applying an opposing mold. The assembly is then inserted within an autoclave heated to a suitable temperature in order to cause the resin coating the pre-preg fibers to melt and cure in order to form a matrix of resin spanning each of the plies and having the carbon fiber embedded therein.

Parts having varying thickness are not manufacturable with repeatable and uniform curing throughout using this prior method. Due to the uniform application of heat, thicker portions of the part will be under-cured and/or thinner portions of the part will be over-cured. Temperature gradients will exist within the part inasmuch as outer surfaces of the part will be at higher temperature than inner portions of the part for significant amounts of time during the curing process. Uniform application of heat to the combined plies and one or more molds also results in thermal expansion of the molds and a corresponding variation in mold geometry and pressure applied to the part.

Composite parts having large thicknesses, i.e., larger than 0.25 inches, are not readily manufactured using plies of pre-preg fiber according to prior methods. Curing of a laminate of multiple plies requires pressing the plies together and distributing of the resin uniformly throughout the laminate while the resin is liquid following melting and prior to cross-linking. In general, pressure is applied by an outer mold liner or vacuum bag pressing inwardly on the part. For thick laminates pressure hysteresis exists throughout the part, i.e., the pressure at different distances from the surface of the part is not uniform. As a result, resin flow throughout the part is not uniform and the inter-ply bonding between plies is likewise not uniform. These non-uniformities result in wrinkling of plies both within the plane of each ply and out of the original plane of each ply. The application of pressure also results in significant compression of the plies from their original thickness. During compression of thick laminates, the large compression distance may cause plies, or fibers within plies, to shift from their original positions, resulting in unpredictability and non-uniformity of part strength.

The effect of pressure hysteresis is exacerbated and compounded by the thermal gradients due to non-uniform thickness. The thermal gradients result in non-uniform resin viscosity and a corresponding increase in the non-uniform resin distribution. Non-uniform resin viscosity also results in non-uniform flow of resin, which increases in plane and out of plane wrinkling of the plies as well as increased porosity of the resin matrix. The presence of thermal gradients also causes stresses within the final part which may cause the part to deform from the dimensions of the mold.

The limitations of prior composite manufacturing processes make them unsuitable for manufacturing composite rotor blades, which generally have a large thickness at the root and a much smaller thickness along much of the blade. It would therefore be an advancement in the art to provide methods and apparatus suitable for manufacturing composite rotor blades having a root portion with a large thickness and a blade portion with a much smaller thickness.

BRIEF SUMMARY OF THE INVENTION

In one aspect of the invention, tooling for manufacturing a rotor blade includes a first mold defining a first mold surface and a second mold comprising a rigid layer and a heated layer secured to the rigid layer. The heated layer defines a second mold surface and is formed of a thermally expandable material.

A plurality of heating elements embedded in the second mold. The first and second mold surfaces define a mold cavity having a shape of a hollow rotor blade spar such that one of the first mold surface and the second mold surface defines a contour of an outer surface of the rotor blade spar and the other of the first mold surface and second mold surface defines a contour of the inner surface of the rotor blade spar. The mold cavity may define a non-uniform blade spar wall thickness between the proximal end and the distal end thereof.

In another aspect of the invention, the second mold surface defines the contour of the inner surface of the rotor blade spar and further includes a root portion and first and second branch portions. The branch portions secure to the root portion and extend between the root portion and the distal end. The branch portions further define a gap therebetween for receiving a shear web. The first and second branch portions may include first and second walls that define the gap there between. The first and second walls may have a helical or twisted shape having a twist angle of from about five to about ten degrees. In some embodiments, the plurality of heating elements are not coextensive with the first and second walls.

In another aspect of the invention, at least one of the first and second molds includes a carbon fiber composite layer and a reinforcing rigid foam layer secured to the carbon fiber layer.

Methods for fabricating a rotor blade are also disclosed. In one aspect of the invention, a method for manufacturing a rotor blade includes placing an uncured composite blade spar having a non-uniform wall thickness between first and second molds. The first mold defines a first mold surface. The second mold includes a rigid core and a heated layer secured thereto.

The heated layer defines a second mold surface and may be formed of a thermally expandable material. The uncured composite blade spar may engage the first and second mold surfaces with or without an intervening release layer. The second mold may further include a plurality of heating elements embedded therein. The plurality of heating elements may be activated according to a plurality of different temperature progressions effective to cure portions of the uncured composite blade spar coextensive with each heating element of the plurality of heating elements.

In another aspect of the invention, the second mold defines a root portion and first and second branch portions, the branch portions securing to the root portion and extending between the root portion and the distal end, the branch portions defining a gap therebetween. In such embodiments, the method may further include placing a shear web between the first and second branch portions prior to placing the uncured composite blade spar between the first and second molds.

In another aspect of the invention, leading and trailing edge fairings are secured to opposing sides of the composite blade spare such that the combined blade spar and fairings form an airfoil contour. The leading and trailing edge fairings may secure to the blade spar by means of adhesives, or a co-curing process, a combination thereof, or the like.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 19B is a front elevation cross-sectional view of a root portion of a blade spar in accordance with the present invention;

FIG. 19C is a front elevation cross-sectional view of a blade portion of a blade spar in accordance with the present invention;

DETAILED DESCRIPTION OF THE PREFERRED EMBODIMENTS

Figure 1:
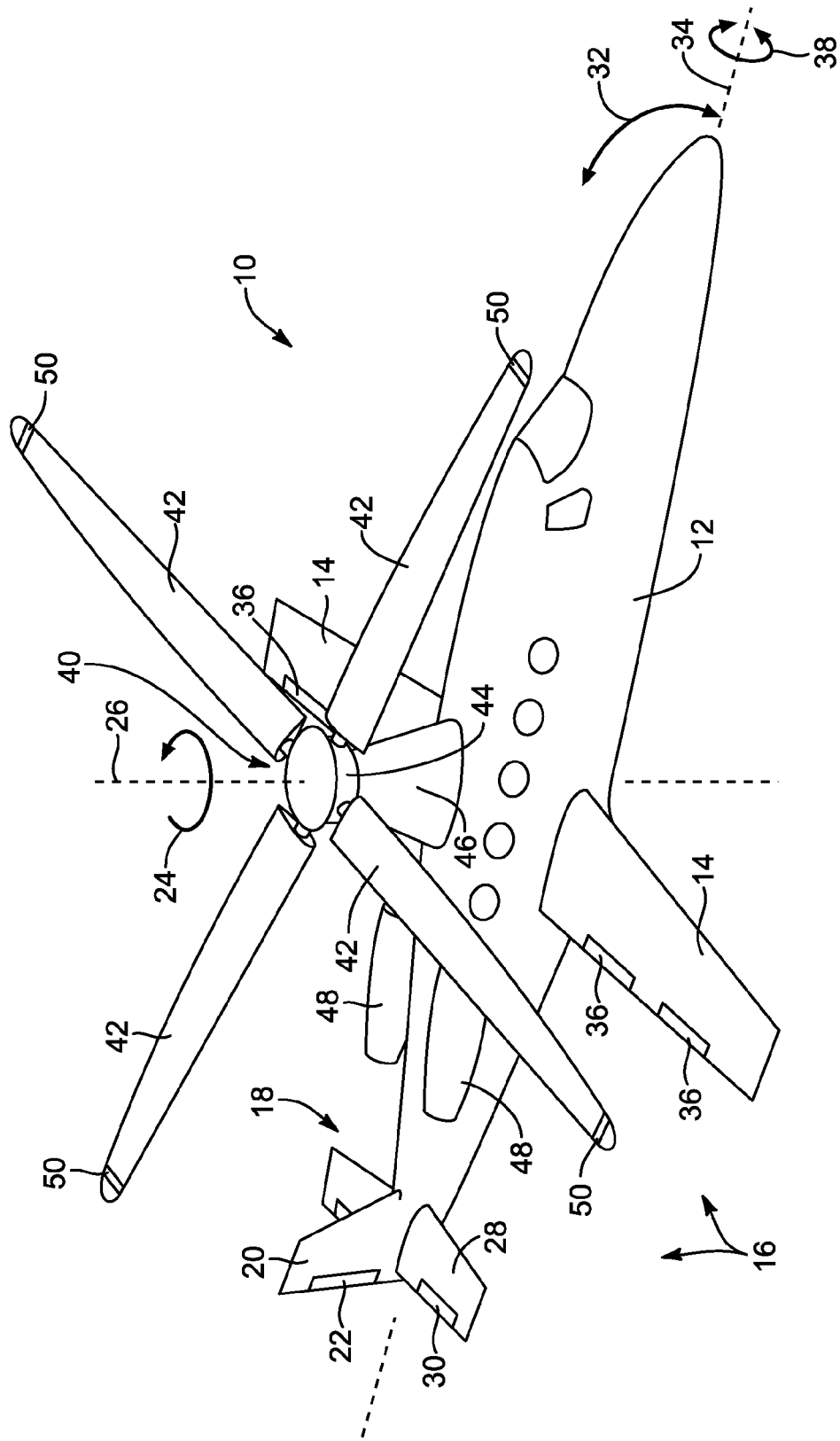
FIG. 1 is an isometric view of an aircraft in accordance with an embodiment of the present invention.

Referring to FIG. 1, an aircraft 10 includes an airframe 12 defining a cabin for carrying an operator, passengers, cargo, or the like. The airframe 12 may include one or more fixed wings 14 shaped as airfoils for providing lift to the aircraft. The wings 14 may be configured such that they provide sufficient lift to overcome the weight of the aircraft 10 only at comparatively high speeds inasmuch as the aircraft 10 is capable of vertical takeoff and landing (VTOL) and does not need lift from the fixed wings 14 at low speeds, e.g. below 50 mph or even 100 mph upon taking off.

In this manner, the wings 14 may be made smaller than those of fixed wing aircraft requiring a high velocity takeoff, which results in lower drag at higher velocities. In some embodiments the wings 14 provide sufficient lift to support at least 50 percent, preferably 90 percent, of the weight of the aircraft 10 at air speeds above 200 mph.

Control surfaces 16 may secure to one or both of the airframe 12 and wings 14. For example a tail structure 18 may include one or more vertical stabilizers 20 and one or more rudders 22. The rudders 22 may be adjustable as known in the art to control the yaw 24 of the aircraft 10 during flight. As known in the art, yaw 24 is defined as rotation about a vertical axis 26 of the aircraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable as known in the art to alter the pitch 32 of the aircraft 10. As known in the art, pitch 32 is defined as rotation in a plane containing the vertical axis 26 and a longitudinal axis 34 of the airframe of an aircraft 10. In the illustrated embodiment, the elevator 30 is a hinged portion of the horizontal stabilizer 28. In some embodiments, twin rudders 22 may be positioned at an angle relative to the vertical axis 26 and serve both to adjust the yaw 24 and pitch 32 of the aircraft 10.

The control surfaces 16 may also include ailerons 36 on the wings 14. As known in the art, ailerons 36 are used to control roll 38 of the airplane. As known in the art, roll 38 is defined as rotation about the longitudinal axis 34 of the aircraft 10.

Lift during vertical takeoff and landing and for augmenting lift of the wings 14 during flight is provided by a rotor 40 comprising a number of individual blades 42. The blades are mounted to a rotor hub 44. The hub 44 is coupled to a mast 46 which couples the rotor hub 44 to the airframe 12. The rotor 40 may be selectively powered by one or more engines 48 housed in the airframe 12, or adjacent nacelles, and coupled to the rotor 40. In some embodiments, jets 50 located at or near the tips of the blades 42 power the rotor 40 during takeoff, landing, hovering, or when the flight speed of the aircraft is insufficient to provide sufficient autorotation to develop needed lift.

Figure 2:
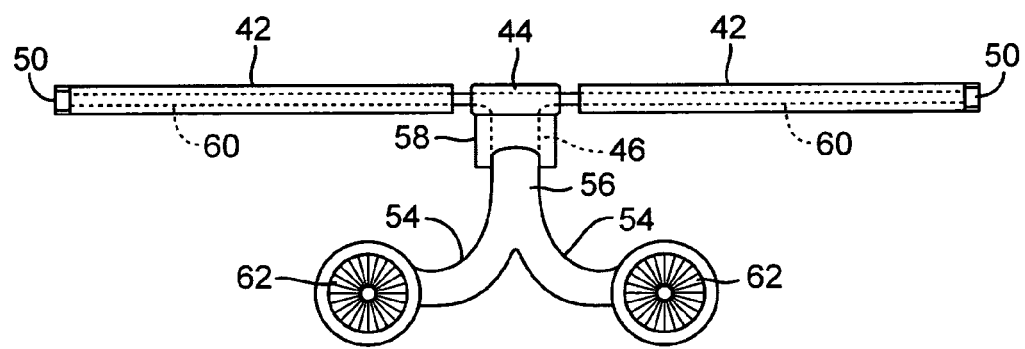
FIG. 2 is a front elevation view of a compressed or otherwise pressurized air supply for a tip jet in accordance with an embodiment of the present invention.

Referring to FIG. 2, while still referring to FIG. 1, in the illustrated embodiment, the engines 48 may be embodied as jet engines 48 that provide thrust during flight of the aircraft. The jet engines 48 may additionally supply compressed air to the jets 46 by driving a bypass turbine 62 or auxiliary compressor. Air compressed by the bypass turbine 62 may be transmitted through ducts 54 to a plenum 56 in fluid communication with the ducts 54.

The plenum 56 is in fluid communication with the mast 46 that is hollow or has another passage to provide for air conduction. A mast fairing 58 positioned around the mast 46 may provide one or both of an air channel and a low drag profile for the mast 46. The mast 46 or mast fairing 58 is in fluid communication with the rotor hub 44. The rotor hub 44 is in fluid communication with blade ducts 60 extending longitudinally through the blades 42 to feed the tip jets 50.

Figure 3A:
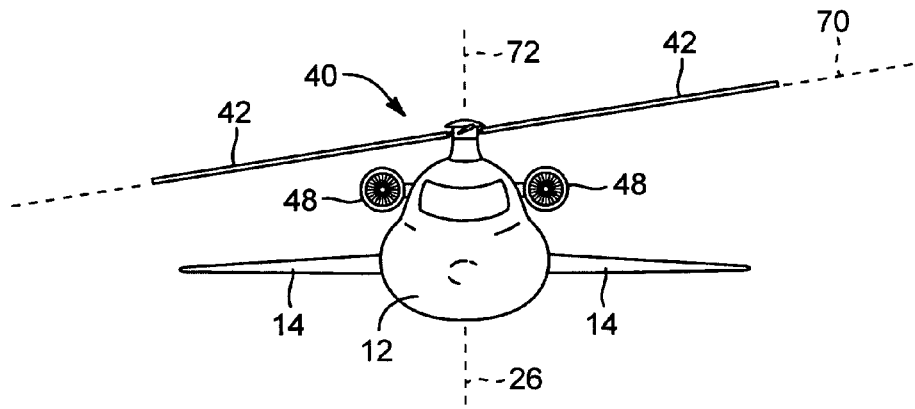
FIG. 3A is a front elevation view of a rotor craft illustrating operational parameters describing a rotor configuration suitable for use in accordance with embodiments of an apparatus and method in accordance with the present invention and the system of FIGS. 1 and 2 in particular.
Figure 3B:
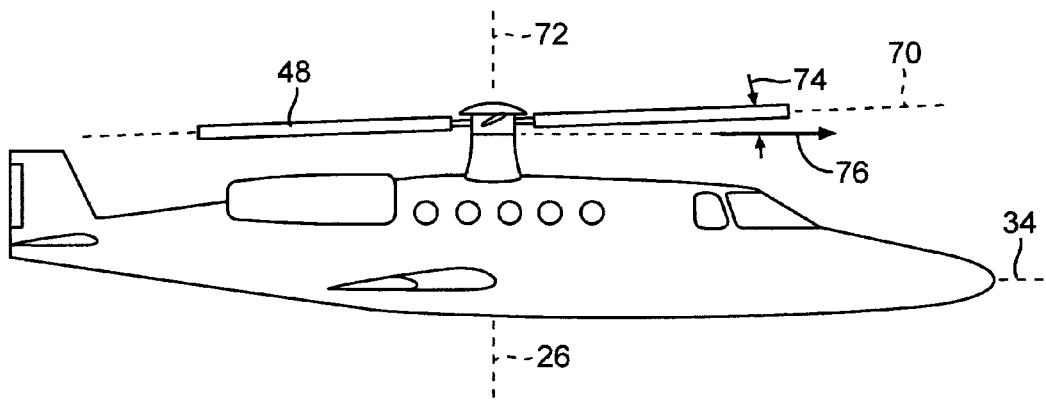
FIG. 3B is a right side elevation view of the rotor craft of FIG. 3A.
Figure 3C:
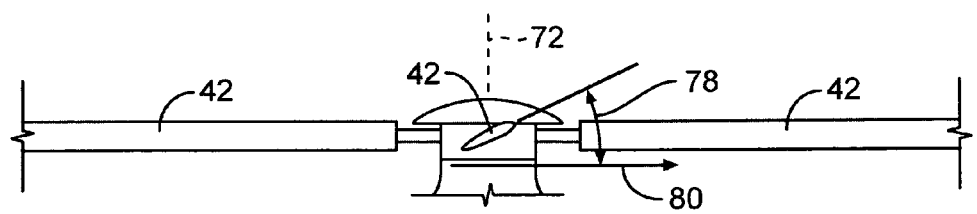
FIG. 3C is a partial cut of a right side elevation view of the rotor of FIG. 3A.

Referring to FIGS. 3A-3C, rotation of the rotor 40 about its axis of rotation 72 occurs in a rotor disc 70 that is generally planar but may be contoured due to flexing of the blades 42 during flight. In general, the rotor disc 70 may be defined as a plane in which the tips of the blades 42 travel. Inasmuch as the blades 42 flap cyclically upward and downward due to changes in lift while advancing and retreating, the rotor disc 70 is angled with respect to the axis of rotation when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the angle of attack 74 or rotor disk angle of attack 74. For purposes of this application, flight direction 76 and air speed refer to the direction and speed, respectively, of the airframe 12 of the aircraft 10 relative to surrounding air. In autogyro systems, the angle of attack 74 of the rotor disc 70 is generally positive in order to achieve autorotation of the rotor 40, which in turn generates lift.

Referring to FIG. 3C, the surfaces of the blades 42, and particularly the chord of each blade 42, define a pitch angle 78, or blade angle of attack 78, relative to the direction of movement 80 of the blades 42. In general, a higher pitch angle 78 will result in more lift and higher drag on the blade up to the point where stalling occurs, at which point lift has declined below a value necessary to sustain flight. the pitch angle 78 of the blade 42 may be controlled by both cyclic and collective pitch control as known in the art of rotary wing aircraft design.

Figure 4:
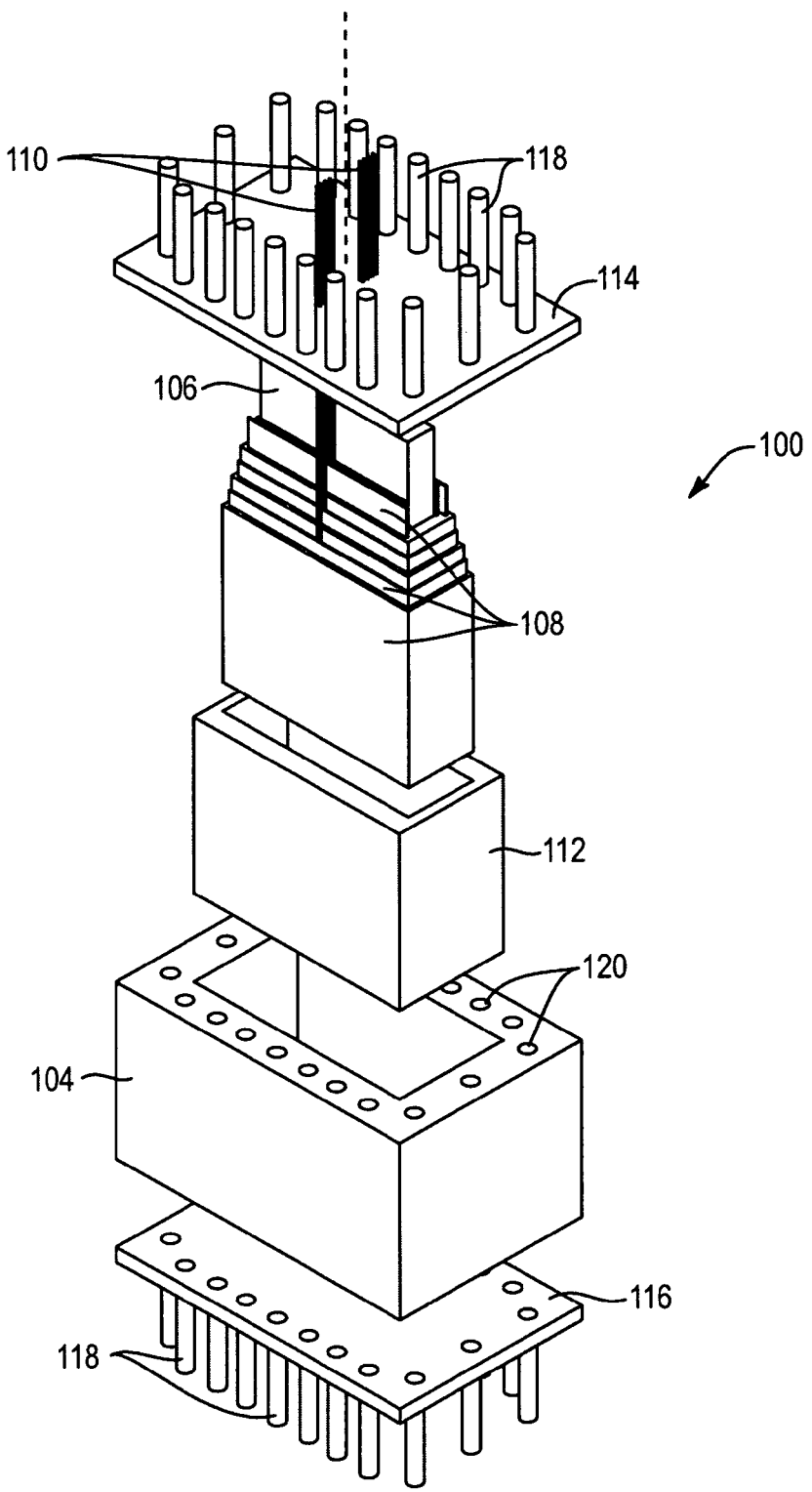
FIG. 4 is an isometric view of tooling suitable for manufacturing composite parts having large and non-uniform thicknesses in an embodiment of a system in accordance with the present invention.

FIG. 4 illustrates tooling 100 for manufacturing thick laminates and laminates of non-uniform thickness. The tooling 100 includes a rigid outer mold 104 and a rigid inner core 106. One or more heated layers 108 secure to the rigid inner core 106. The heated layers 108 include a thermally expandable material, whereas the outer mold 104 and inner core 106 include rigid materials with comparatively very low coefficients of thermal expansion.

In some embodiments, one or both of the outer mold 104 and inner core 106 are formed of carbon fiber composite materials reinforced with a rigid foam or other polymer. Carbon fiber materials are advantageously strong, lightweight, and have a comparatively low coefficient of thermal expansion.

Throughout the following description, references to the outer mold 104 and inner core 106 may be interchanged. That is to say, for example, that the inner core 106 having the heated layer 108 may serve as the outer mold whereas the configuration of the outer mold 104 may serve as the inner core. In all respects, the outer mold 104 and functions ascribed thereto may also be served by a mold that is in fact located within a part having a closed shape. Likewise, the inner core 106 and the heated layer 108 secured thereto may surround an outer surface of a part having a closed shape.

The heated layers 108 may be formed of silicone or some other polymer that does not degrade significantly when exposed to temperatures used or required for curing carbon fiber composites for multiple curing cycles. The heated layers 108 may have heating elements and thermal sensors embedded therein, coupled to control lines 110 for monitoring and controlling the application of heat during a curing process.

A composite part 112 having one or both of a large thickness and non-uniform thickness is captured between the heated layers 108 and the outer mold 104. In the illustrated embodiment, the composite part 112 has a closed shape having both convex and concave surfaces. Composite parts 112 having open shapes with both concave and convex surfaces may also benefit from the present invention. In the illustrated embodiment, the heated layers 108 fit within the composite part 112. However, in some embodiments, the heated layers 108 secure to the outer mold 104 and surround the composite part 112.

A top plate 114 and a bottom plate 116 may secure to the outer mold 104 in order to retain the part 112, inner core 106, and heated layers 108. Lines 118 conveying coolant to or away from the tooling 100 may secure or pass through the top and bottom plates 114, 116. The outer mold 104 may include passages 120 for connecting to other tubes carrying cooling fluid or in fluid communication with the lines 118 carrying cooling fluid to and away from the top and bottom plates 114, 116. The flow of cooling fluid may be maintained to enable control of the temperature of the composite part 112 within a proscribed range during the curing process. In some embodiments, the passages 120 also pass through the inner core 106.

Figure 5:
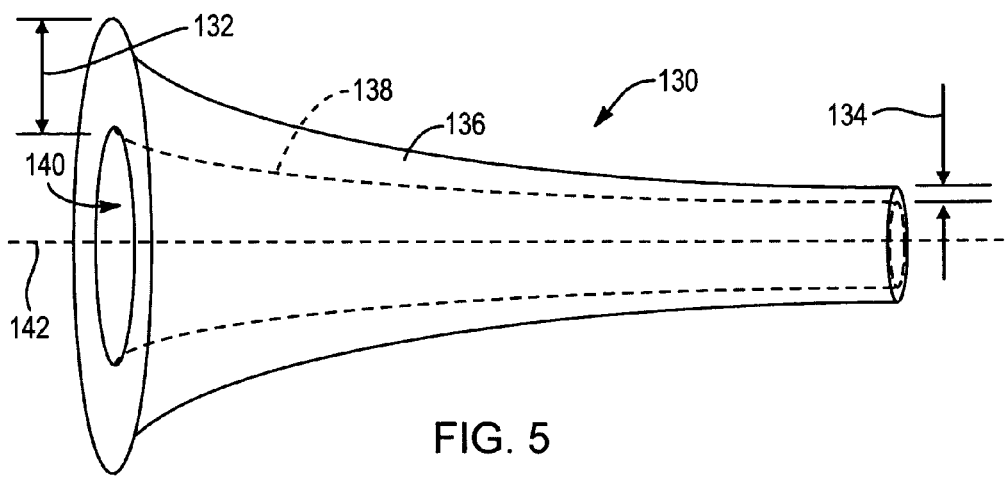
FIG. 5 is an isometric view of a part having large and non-uniform thickness suitable for manufacture using methods in accordance with the present invention.

Referring to FIG. 5, a part 130, suitable for manufacture according to the method and apparatus described herein, may have a portion having a maximum thickness 132 and a minimum thickness 134 significantly different from one another. For example, the maximum thickness 132 may be greater than five times, or even greater than 10 times, the minimum thickness 134.

The part 130 may define a closed shape such that the part 130 defines a closed outer surface 136 and a closed inner surface 138. The inner surface 138 may define a cavity 140. The part 130 may define a longitudinal axis 142 passing through the cavity 140 of the part 130 and may be symmetrical or asymmetrical about the longitudinal axis 142. Other parts 130 having open concave and convex surfaces or even substantially planar shapes may also benefit from the methods described herein, particularly those parts 130 having large or non-uniform thicknesses.

Figure 6:
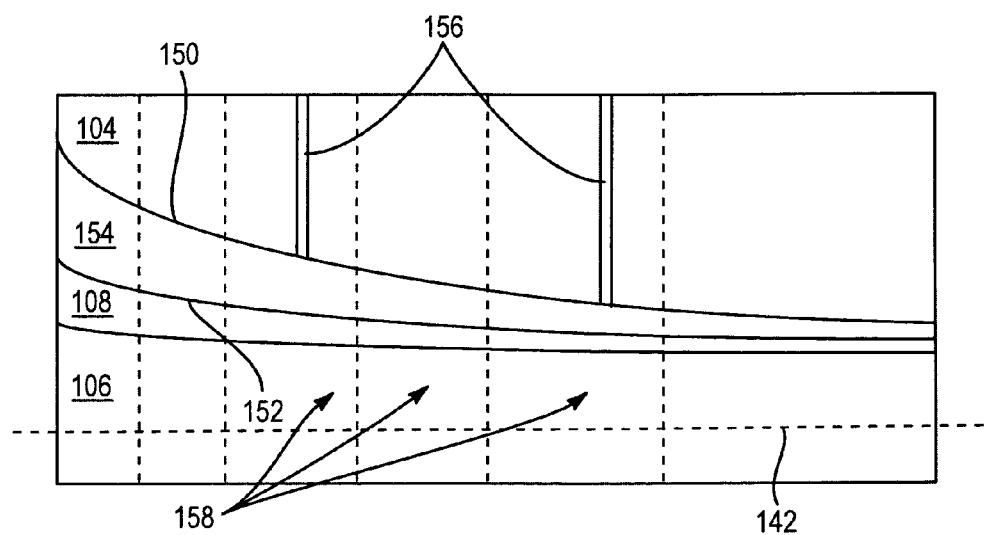
FIG. 6 is partial side elevation cross-sectional view of tooling for manufacturing composite parts having large and non-uniform thicknesses in accordance with the present invention.

FIG. 6 illustrates a cross section of an upper section of the tooling 100 for manufacturing the part 130 of FIG. 5. The tooling 100 includes the rigid core 106, rigid outer mold 104, and a heated layer 108, which may be formed by one or more layers of material. A mold surface 150 of the outer mold 104 and a mold surface 152 of the heated layer 108 define a cavity 154 in which an uncured composite part is assembled.

Gas passages 156 may conduct gasses emitted from the composite part during the curing process away from the cavity 154. In the illustrated embodiment, the gas passages 156 pass through the outer mold 104 from adjacent the mold surface 150.

One or more of the rigid core 106, rigid outer mold 104, and heated layer 108 may be divided into zones 158. In FIG. 6, the boundaries of the zones 158 are indicated by the parallel vertical dotted lines. In one embodiment, at least the heated layer 108 is divided into zones 158. The heated layer 108 may include separate pieces corresponding to each zone 158, or the zones 158 may be logical or process-sequence related rather than physical or "geographical." The zones may be defined by planes perpendicular to the longitudinal axis 142 of the part 130 to be manufactured therein. Alternatively, the zones 158 may have any shape such that the combined zones 158 define one complete mold surface 152, where the heated layer 108 is divided into zones 158, and another complete mold surface 150 where the outer mold 104 is divided into corresponding zones 158.

Figure 7:
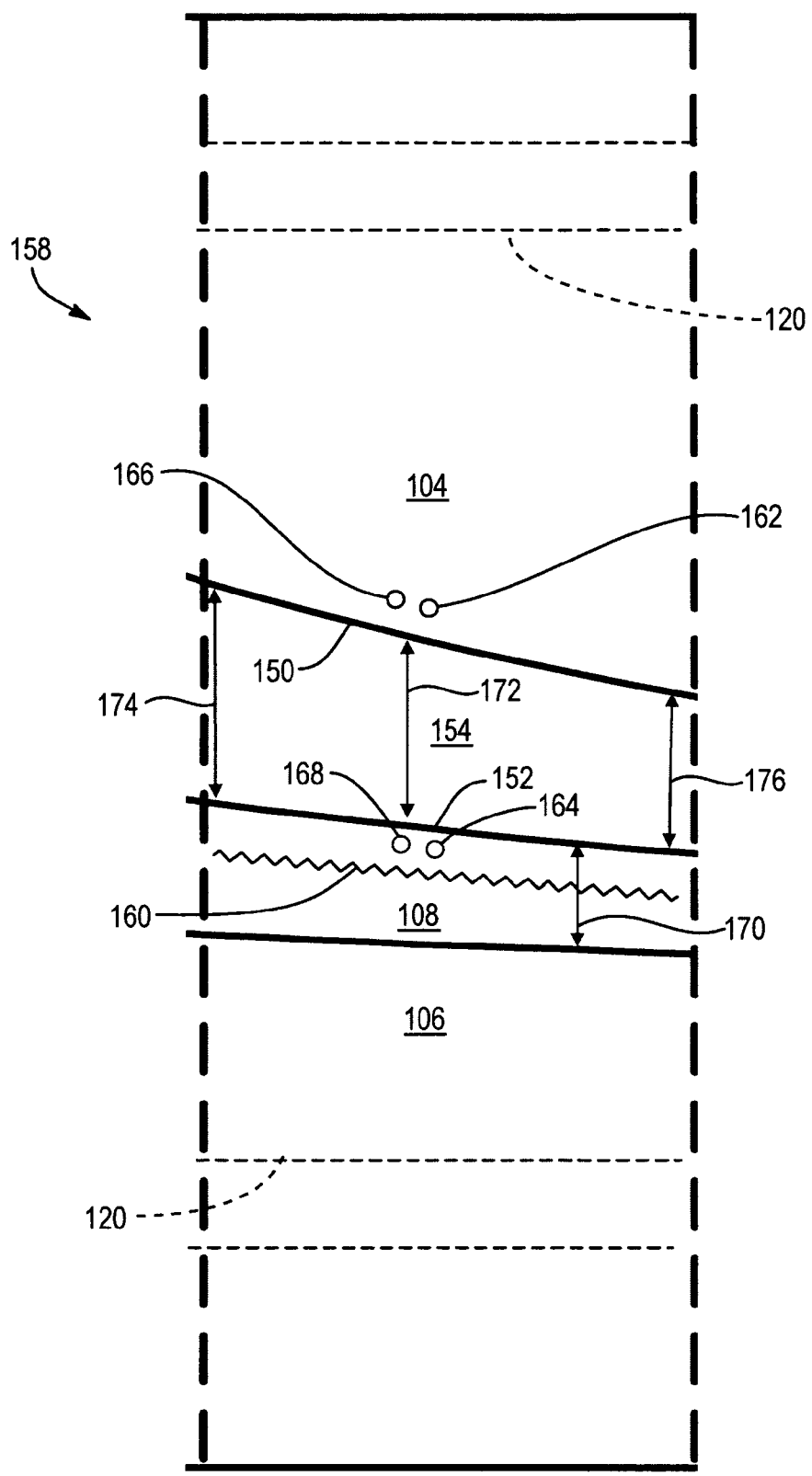
FIG. 7 is a partial side elevation cross-sectional view of a thermal zone of tooling for manufacturing composite parts having large and non-uniform thicknesses in accordance with the present invention.

Referring to FIG. 7, each zone 158, includes a heating element 160. The heating elements 160 may have an area extending across the entire zone 158 or may have an arbitrary size smaller than the area of the zone 158 but located near the center of the zone. The heating elements 160 may substantially encircle the inner core 106 where the zone 158 is defined between planes perpendicular to the longitudinal axis 142 of a tooling for making a part 130 having a closed shape.

For example, the heating element 160 may be embodied as a strip wrapped around the inner core 106 such that the ends thereof overlap or are separated by a thermally insignificant, small gap. The passages 120 passing through the outer mold 104 inner core 106, or both, may carry cooling fluid to enable reduction of the temperature of the zone 158 by deactivating the heating elements 160. The cooling fluid passing through the passages 120 may enable independent control of the temperature of the zones 158 by drawing away heat from one zone 158 that diffuses to an adjacent zone 158.

A thermal sensor 162 may be embedded in the outer mold 104 adjacent the mold surface 150 within each zone 158. A thermal sensor 164 may alternatively or additionally be embedded in the heated layer 108 adjacent the mold surface 152 within each zone 158. The thermal sensors 162, 164 provide feedback to enable control of the heating element 160 of each zone 158. There may be multiple sensors 162, 164 for each zone 158.

The heated layer 108 has a coefficient of thermal expansion selected such that heating of the heated layer 108 during the curing process will increase pressure exerted on composite material positioned within the cavity 154. For example, the heated layer 108 may have a coefficient of thermal expansion greater than $5 \times 10^4$ $K^{-1}$, preferably greater than $7 \times 10^4$ $K^{-1}$. Monitoring of pressure exerted on carbon fiber plies within the cavity 154 may be provided by one or both of a pressure sensor 166 secured to or embedded in the outer mold 104 adjacent the mold surface 150 and a pressure sensor 168 secured to or embedded in the heated layer 108 adjacent the mold surface 152 or secured to or embedded in the inner core 106.

The thickness 170 of the heated layer 108 between the core 106 and mold surface 152 may be anisotropic across all or part of the extent thereof, such that the amount of expansion of the heated layer 108 is correspondingly anisotropic. In this manner, the pressure exerted on composite plies within the cavity 154 will be anisotripic as well. The pressure requirement for each discrete element of the composite part may correspond to the thickness thereof and may also correspond the thickness of adjacent discrete elements. The anisotropy of the thickness 170 may therefore correspond to the anisotropic pressure requirements for proper curing of a part 130 having anisotropic thickness.

The cavity 154, corresponding to the final shape of the part 130 formed therein, may have an average thickness 172 within each zone 158, defined as the average separation distance between the mold surface 150 and the mold surface 152. The boundaries of each zone 158 may be chosen such that the maximum thickness 174 and the minimum thickness 176 of the cavity 154 within each zone 158 is within some tolerance of the average thickness 172. Thus, applying the same temperature progression to the entire zone 158 will not result in significant over or under curing throughout the zone 158.

The tolerance may be a function of the average thickness 172, such as a multiple of the average thickness 170. It may be a polynomial, exponential function, other function, or combination thereof based on thickness or the average thickness 170. The permitted tolerance between the maximum thickness 174 and the average thickness 172 may be different than the tolerance between the minimum thickness 174 and the average thickness 172.

Figure 8A:
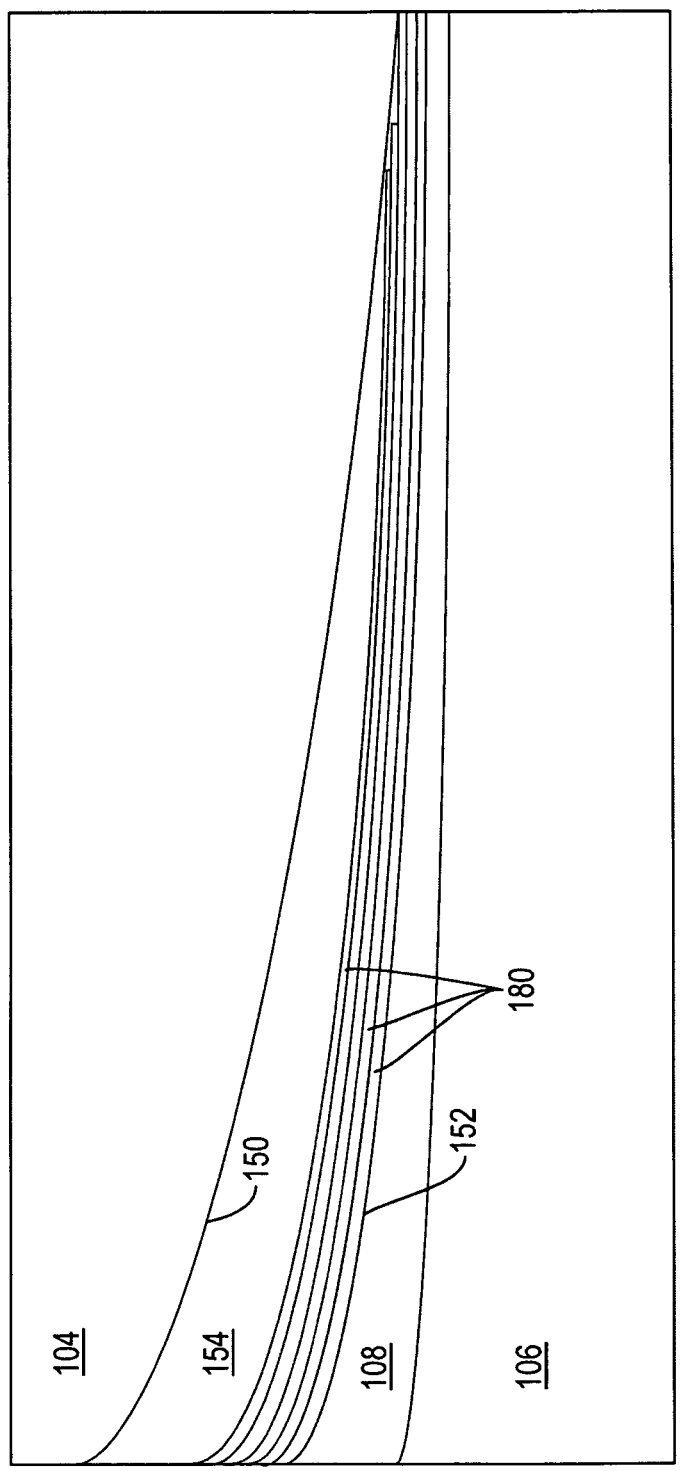
FIGS. 8A through 8D are side elevation cross-sectional views illustrating a process for manufacturing composite parts having large and non-uniform thicknesses in accordance with the present invention.

FIGS. 8A through 8D illustrate a method for assembling composite plies within the tooling 100. Referring specifically to FIG. 8A, the part 130 may be formed by applying a ply allocation 180 to the mold surface 152. The ply allocations 180 may each include one or more plies and preferably includes fewer than the total number of plies needed to form the entire part 130. The shape of each ply is dependent on the geometry of the part 130. The combination of shapes and numbers of plies to form the complete part 130 may be determined as known in the art of composite part design.

Figure 8B:
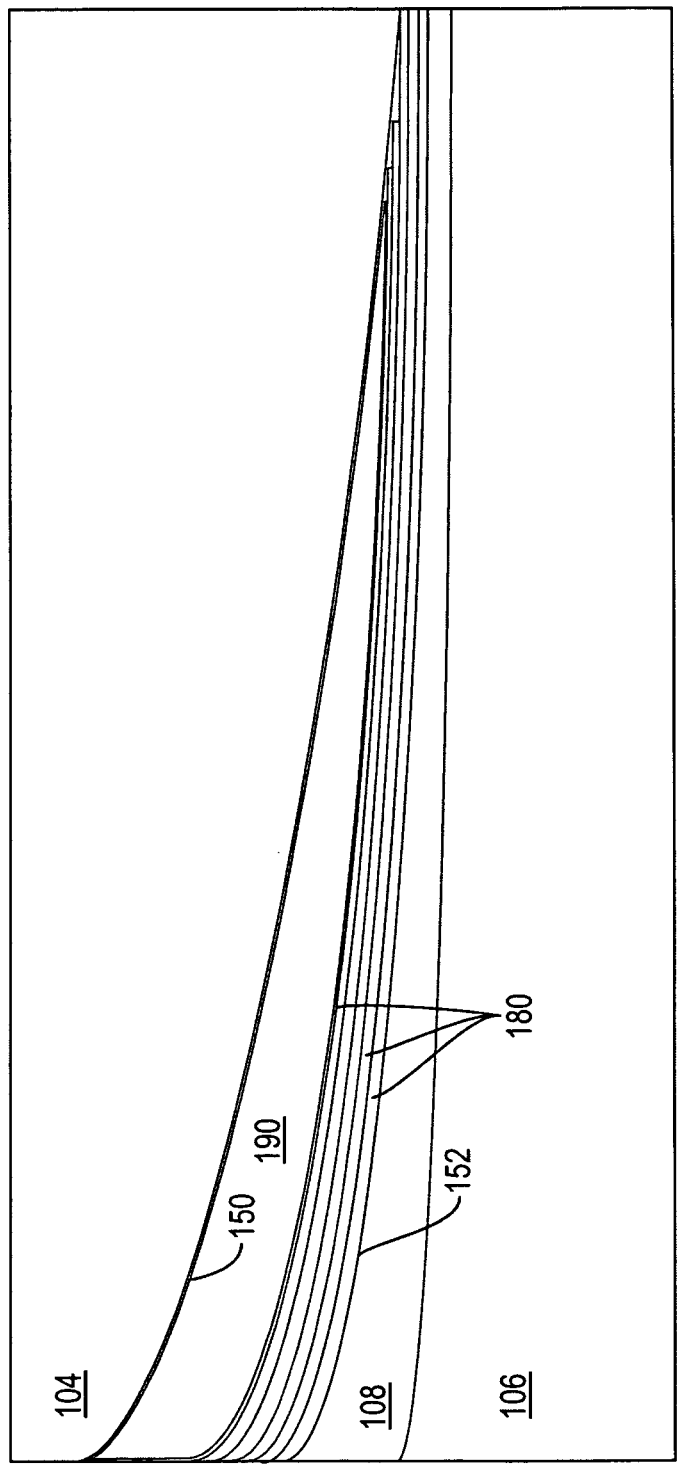

Referring specifically to FIG. 8B, following application of each ply allocation 182, a shim 190 may be positioned over the last ply allocation 182. The outer mold 104 may likewise be secured over the shim 190 to capture the shim 190 and ply allocations 182 between the mold surface 150 and the mold surface 152. The shim 190 may be formed of a thermally expandable material and may be rigid or flexible. The shim 190 may also be breathable or porous. Thus, air trapped between the plies and volatile chemicals released from the plies can readily escape.

The shim 190 may be sized to occupy the portion of the cavity 154 not occupied by the ply allocations 180. Accordingly, a plurality of shims may be used. Thus, following application of each ply allocation 180, a shim 190 filling the remaining volume of the cavity 154 after application 180 may be used to debulk each ply allocation 180. Alternatively, each shim 190 may be used to debulk multiple ply allocations 180. In some embodiments, multiple shims 190 are used for each debulking step following application of each ply allocation. For example, prior to each debulking step, or multiple, contiguous, debulking steps, a corresponding shim 190 may be removed to make room for subsequent ply allocations 180.

The ply allocations 180, especially the most recently applied ply allocation 180, may then be debulked. Debulking may be accomplished by pressure applied to the shim 190 and outer mold 104 in order to apply pressure to the ply allocations 180, without the application of further heat and pressure. Alternatively, the heating elements 160 may also be activated in order to partially cure the ply allocations 180, e.g., "green cure" the ply allocations 180 (as known in the art of composite manufacture) in addition to applying pressure due to thermal expansion of the heated layer 108. Green curing the ply allocations 180 may include curing the ply allocations such that the degree of cross linking throughout the resin thereof is less than or equal to about 30% of the final degree of desired cross linking thereof.

Figure 8C:
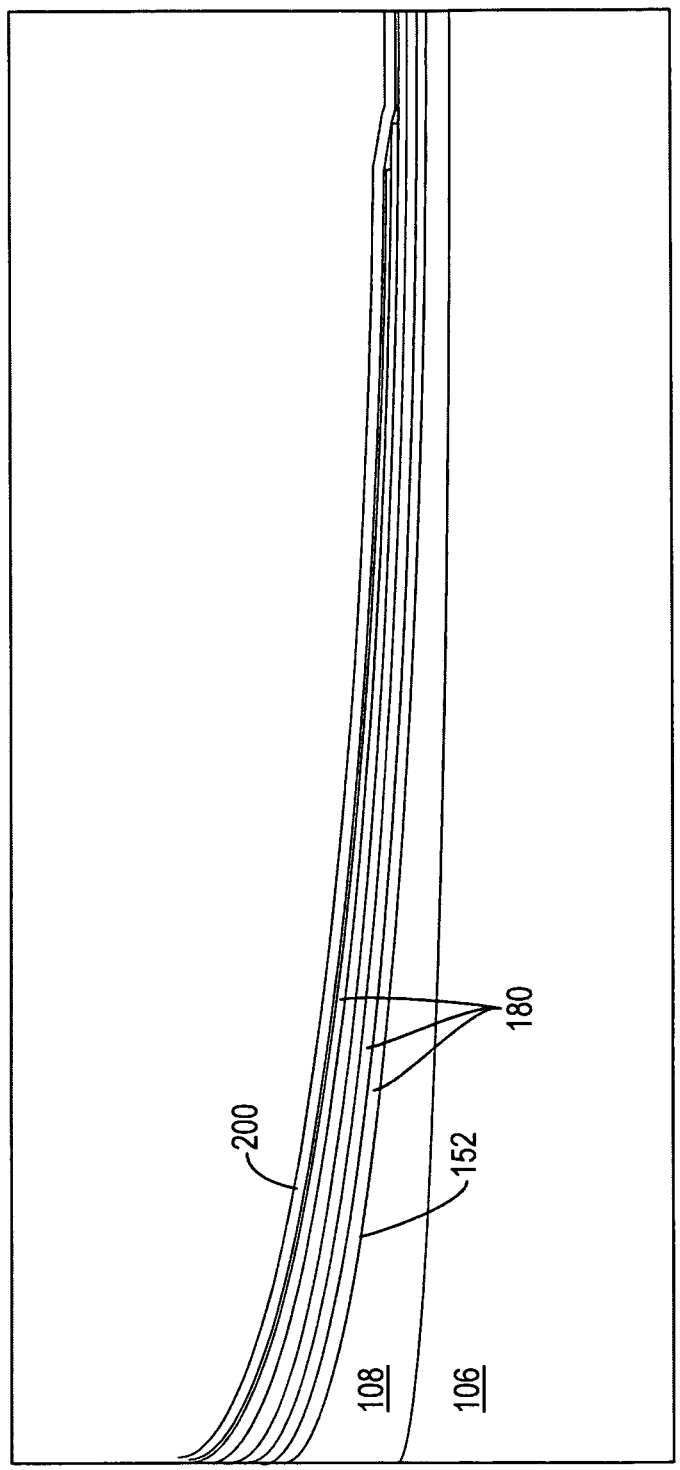

Referring to FIG. 8C, in an alternative embodiment, a vacuum bag 200 may be placed over the plies 180 and heated layer 108 and air drawn from the vacuum bag 200 in order to increase ambient pressure exerted on the plies 180. In addition, the heating elements 160 may be activated to green cure the plies 180.

Figure 8D:
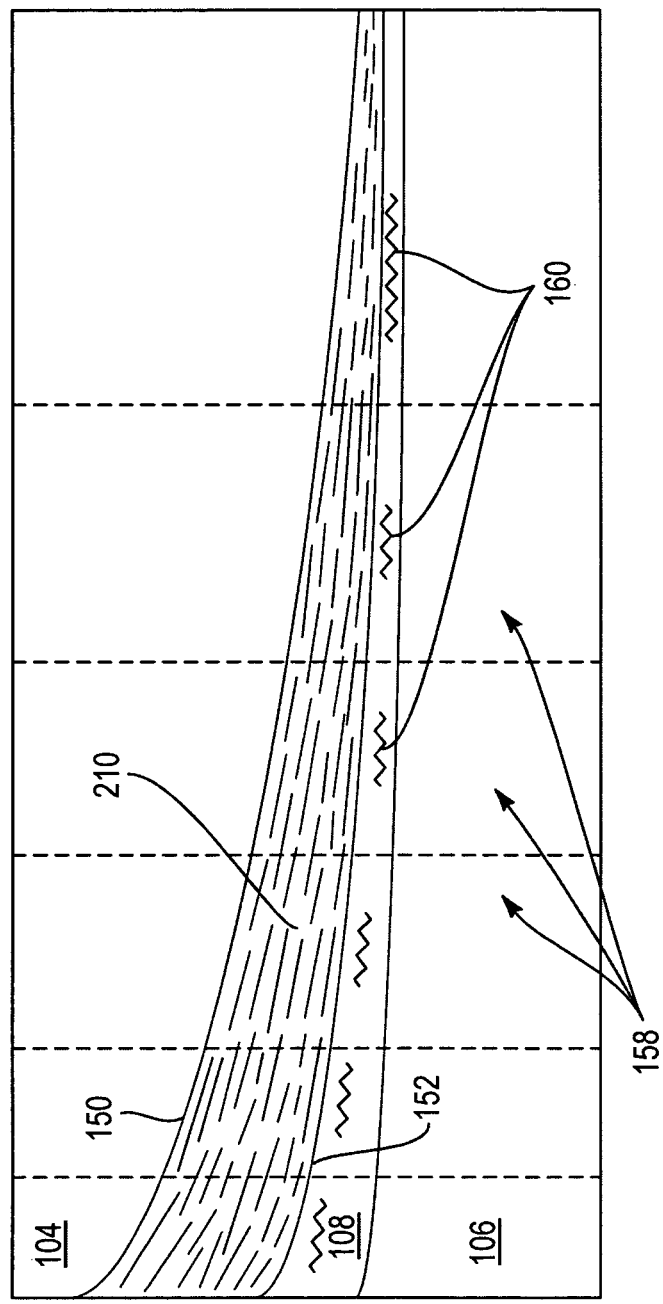

Referring to FIG. 8D, the steps illustrated in FIG. 8A and in FIG. 8B or 8C may be repeated for a plurality of ply allocations 180 until an uncured assembly 210 of plies 180 is assembled within the cavity 180. Upon placing the final ply 180, the outer mold 104 may be placed over the uncured assembly 210. The uncured assembly 210 may then be cured by activating the heating elements 160 of each zone to apply a temperature progression, to each zone, corresponding to the thickness thereof.

As already noted, activating the heating elements 160 also increases the pressure applied to the uncured assembly 210 due to thermal expansion of the heated layer 108. Following curing, the outer mold 104 may be removed and the finished part 130 may be extracted. Following extracting the part 130 may be further machined to remove resin flash and burrs formed when resin seeps into cracks between halves of the outer mold 104.

Figure 9:
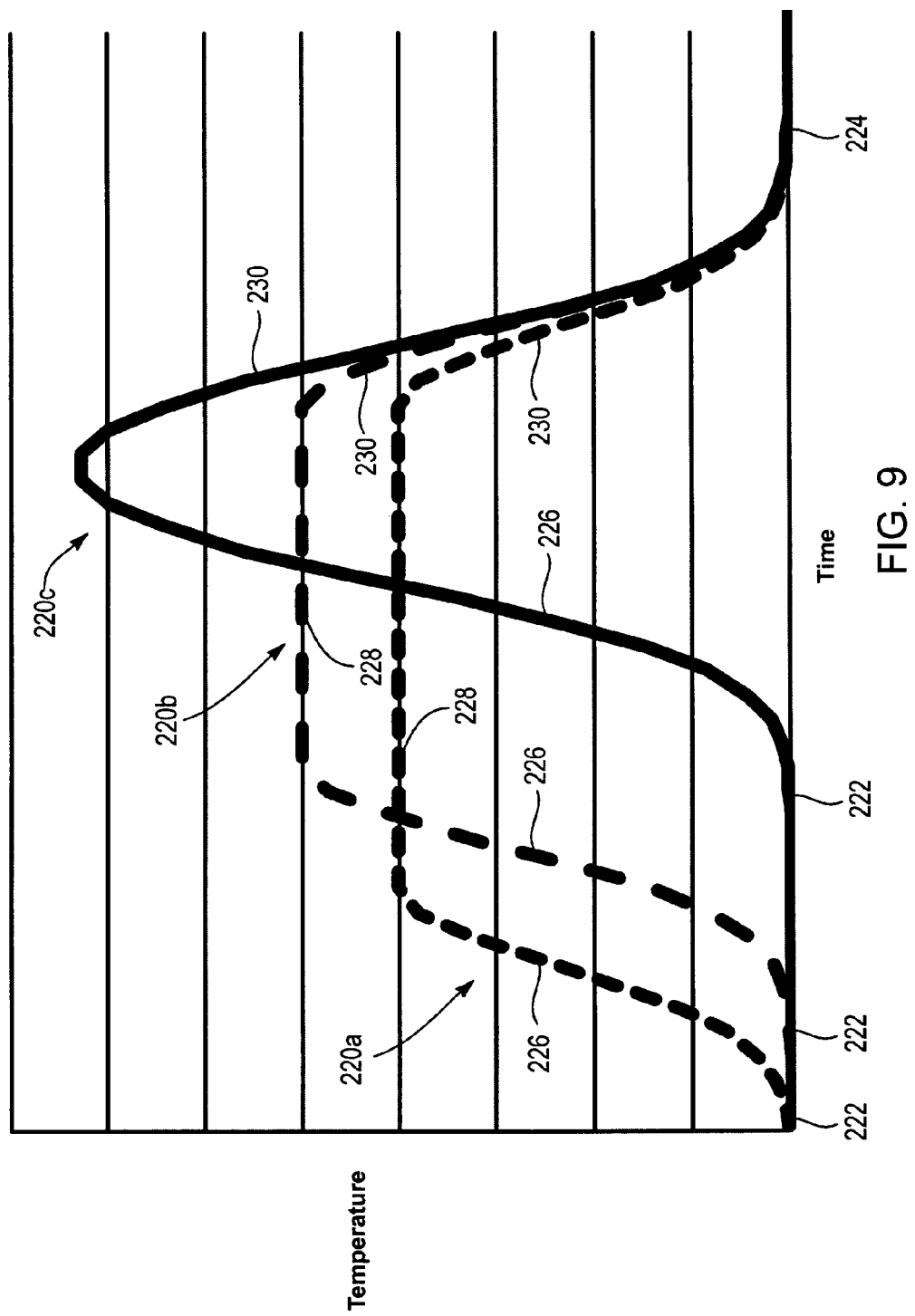
FIG. 9 illustrates plots of zonal temperature progressions for manufacturing composite parts having large and non-uniform thicknesses in accordance with the present invention.

Referring to FIG. 9, each zone 158 may have a temperature progression 220a, 220b, 220c suitable to cure the portion of the uncured assembly 210 adjacent the portion of the mold surface 152 of the zone 158. Feedback from the one or more thermal sensors 162, 164 may be used to activate the heating element. This helps approximate each temperature progression 220a, 220b, 220c in order to properly cure each portion of the uncured assembly 210. Each may be cured corresponding to each zone 158 according to cure kinetics as known in the art of composite fabrication. Considerations may include analysis and controls as per the fields of dynamic mechanical analysis (DMA), thermogravimetric analysis (TGA), and differential scanning calorimetry (DSC).

The temperature progressions 220a, 220b, 220c may each have a start time 222 relative to one another and an end time 224. The start times 222 may be chosen such that the end times 224 occur substantially simultaneously. Each temperature progression 220a, 220b, 220c may also include a rise profile 226, a dwell period 228, and a fall profile 230 opposite the rise profile 226. The rise profile 226 defines the rate at which the temperature of the heated layer 108 is ramped upward for each zone 158 during the curing process. The dwell period 228 defines the temperature at which the zone 158 is to be maintained or soaked for a significant portion of the curing process.

For thin laminates, the dwell period 228 may be very short or nonexistent. For thick laminates the temperature of the dwell period 228 may be comparatively low and the duration comparatively long. The fall profile 230 defines the rate at which the temperature of a zone 158 is reduced from the dwell temperature to ambient and may be effective to reduce residual thermal strain within the finished part 130.

Figure 10:
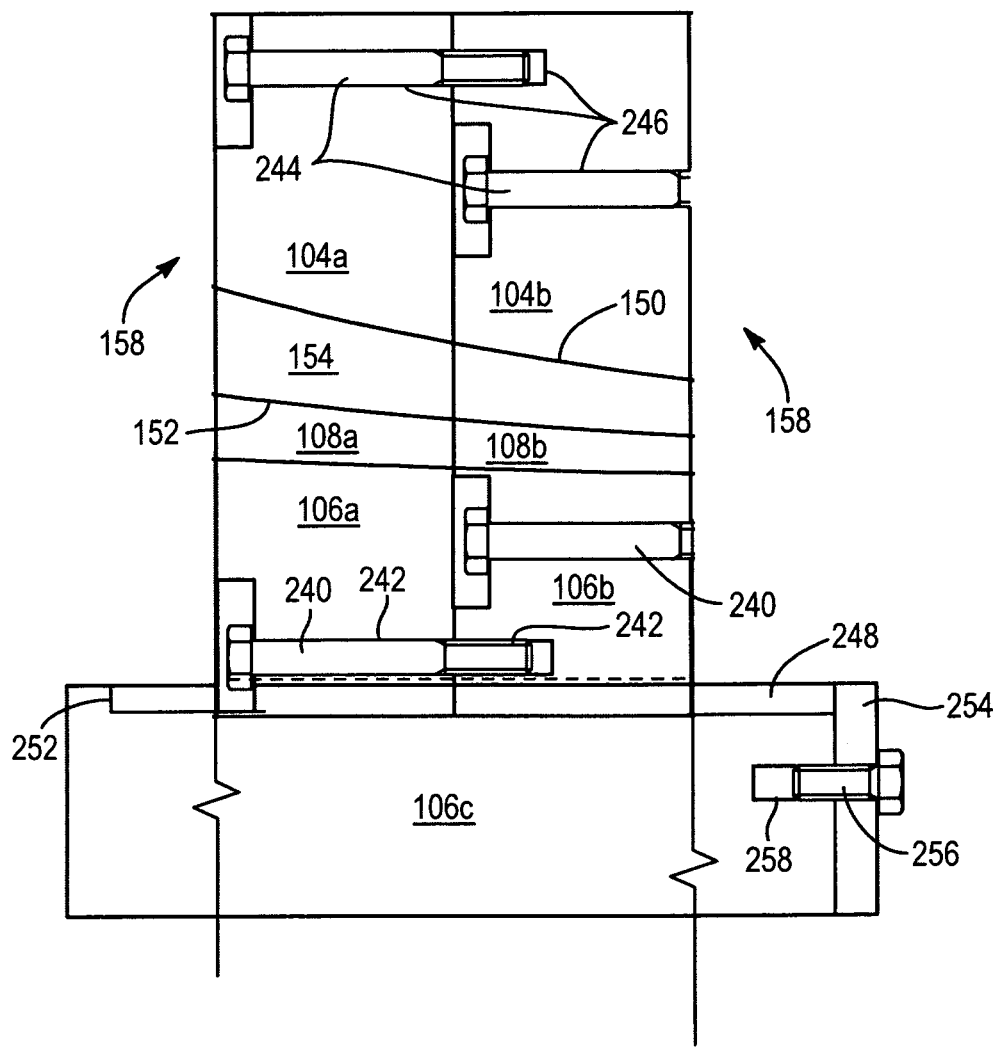
FIG. 10 is a partial, side elevation cross-sectional view of sectional tooling for manufacturing composite parts having large and non-uniform thicknesses in accordance with the present invention.

Referring to FIG. 10, in some embodiments, the zones 158 may include separate pieces of one or more of the outer mold 104, inner core 106, and heated layer 108. In some embodiments, only the heated layer 108 is embodied as separate pieces 108a, 108b. The pieces 108a, 108b may be fastened to corresponding pieces 106a, 106b of the inner core 106, such as by means of an adhesive. The pieces 106a, 106b of the inner core 106 may secure to one another by means of fasteners 240 extending through apertures 242 in the pieces 106a, 106b. The fasteners 240 may be embodied as bolts or screws and the apertures 242 may be threaded to receive the fasteners 240. Likewise, in embodiments where the outer mold 104 is formed of separate pieces 104a, 104b, fasteners 244 received in apertures 246 formed in the outer mold pieces 104a, 104b may secure the pieces to one another.

Forming one or more of the inner core 106 and heated layer 108 out of separate pieces may enable replacement of each piece individually as it wears out. In particular, pieces of the heated layer 108 and their corresponding heating elements 160 having a high dwell temperature and long dwell time may wear out more quickly, due to thermal degradation. They may, therefore, be made replaceable separately to reduce tooling costs.

Figure 11:
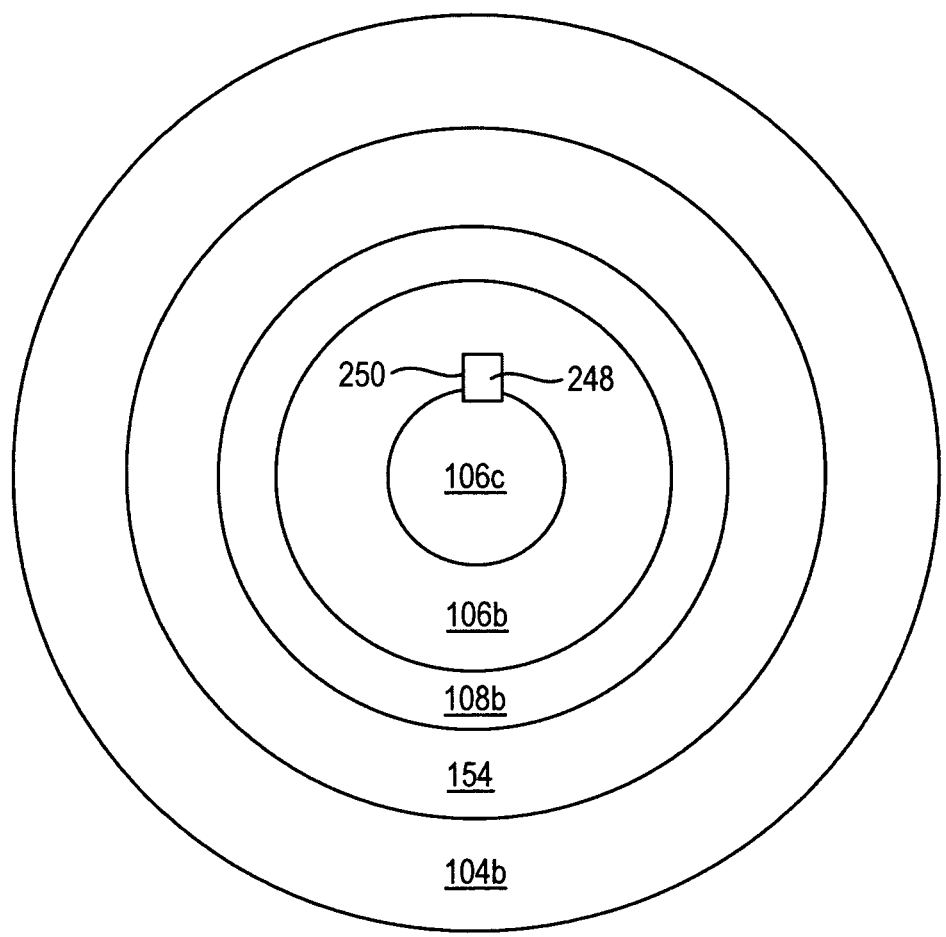
FIG. 11 is an end elevation, cross-sectional view of sectional tooling for manufacturing composite parts having large and non-uniform thicknesses in accordance with the present invention.

Referring to FIG. 11, while still referring to FIG. 10, in some embodiments, the inner core 106 includes a core center 106c to which the pieces 106a, 106b of each zone secure. For example, the core pieces 106a, 106b may define a central aperture into which the core center 106c inserts. A key 248 secured to the core center 106c may serve to register the pieces 106a, 106b with respect to one another and the core center 106c by engaging a keyway 250 formed in the pieces 106a, 106b.

In some embodiments, the pieces 106a, 106b may be captured between a stop 252 secured to or formed monolithically with, the core center 106c and a clamp 254. The clamp 254 may be selectively secured to the core center 106c after all of the pieces 106a, 106c are secured to the core center 106c. The clamp 254 may be secured to the core center 106c by means of fasteners 256 secured within an aperture 258 formed in the core center 106c.

Other structures or methods for securing and aligning mold pieces may be used to form an inner or outer mold as known in the art of composite manufacture. Other manufacturing methods such as metal, thermoplastic, or ceramic casting may be used to secure and align pieces 106a, 106b of the inner core, pieces 104a, 104b of the outer mold 104, or both.

Figure 12:
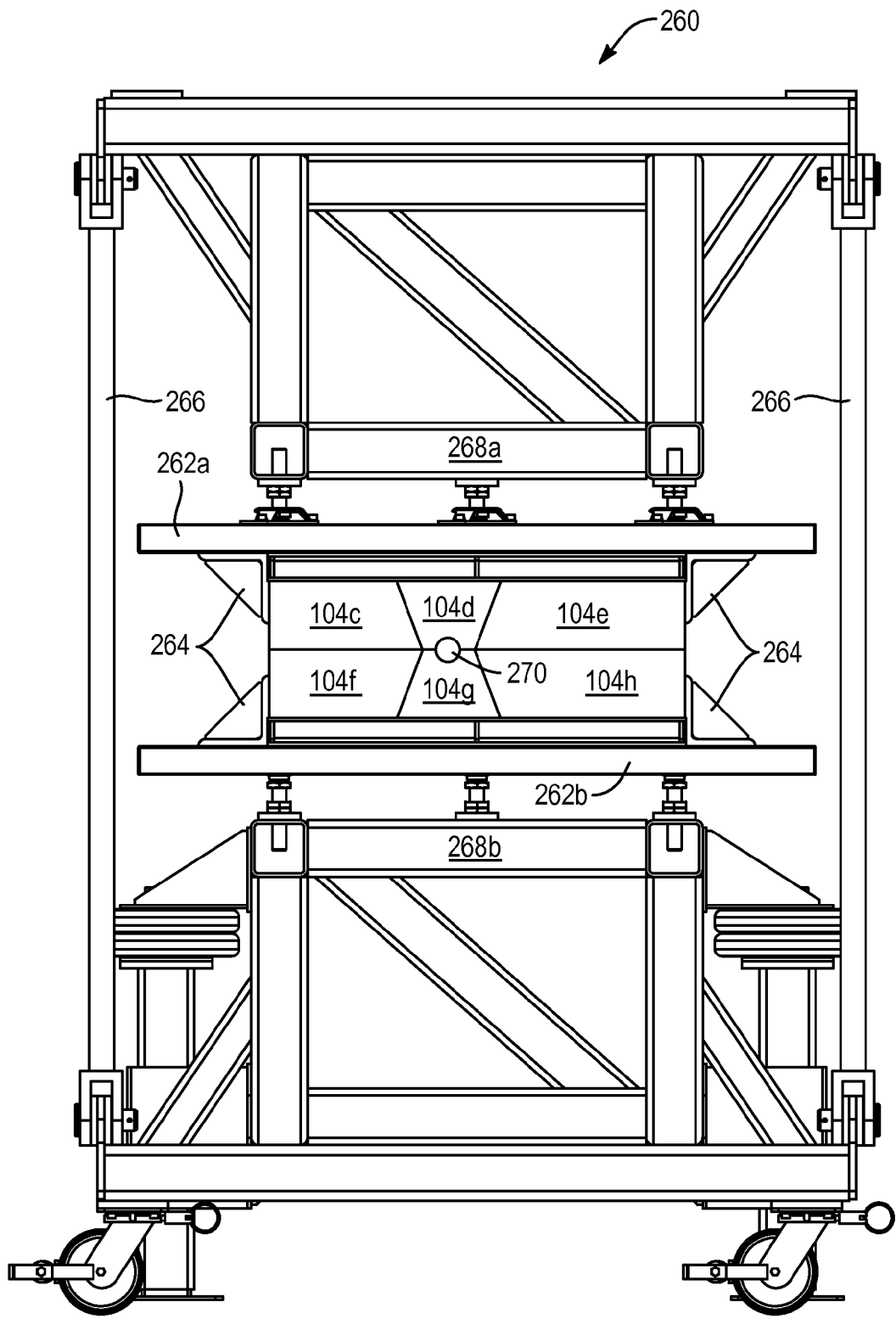
FIG. 12 is a side elevation view of fixturing for retaining tooling for manufacturing composite parts having large and non-uniform thicknesses in accordance with the present invention.

Referring to FIG. 12, during curing, the heated layer 108 expands and exerts outward pressure on the outer mold 104. Fixturing 260 may maintain the outer mold 104 in position and prevent deflection of the outer mold 104. Various fixturing systems to maintain pieces of a mold registered and sealed together, in the art of composite manufacture or elsewhere may be used. The fixturing system 260 may also include fixturing systems used in other fabricating methods making use of molds such as metal, thermoplastic, or ceramic casting.

The illustrated fixturing 260 includes an upper clamping plate 262a and a lower clamping plate 262b. Each of the plates 262a, 262b may include lateral clamps 264 secured thereto. These claims 264 engage lateral sides of the outer mold 104 when the upper clamping plate 262a engages an upper surface and the lower clamping plate 262b engages a lower surface. Tie rods 266 secure to the upper and lower clamping plates 262a, 262b and hinder separation thereof.

Pressure distribution trusses 268a, 268b may couple the tie rods 266 to the plates 262a, 262b, respectively. In the illustrated embodiments, the outer mold 104 includes a plurality of sections 104c-104h held in place by the upper and lower clamps 262a, 262b. The mold sections 104c-104h may define an aperture 270 through which the inner core 106 is exposed. This may serve to enable routing out of the outer mold 104 of lines coupled to the heating elements 160, thermal sensors 162, 164, and pressure sensors 166, 168.

Figure 13:
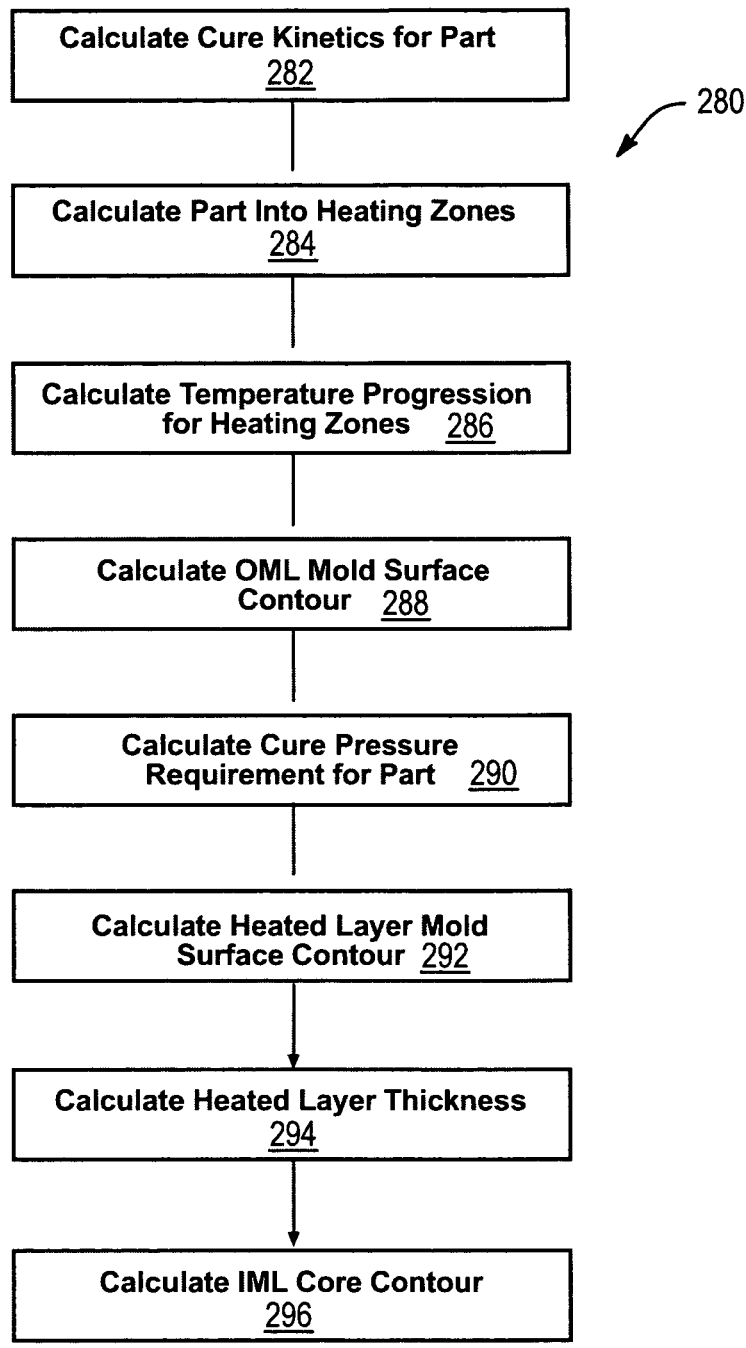
FIG. 13 is a process flow diagram of a method for designing tooling for manufacturing composite parts having large and non-uniform thicknesses in accordance with the present invention.

FIG. 13 illustrates a method 280 for designing tooling 100 for manufacturing a part 130 having a large thickness and/or non-uniform thickness. At step 282, cure kinetics for a model having the nominal geometry of the part 130 are calculated. The cure kinetics (reaction kinetics) may be calculated for discrete elements of the model. The discrete elements may be embodied as columns of material between opposing surfaces of the model and having constant or non-constant cross section.

The model may be divided into discrete elements by dividing a first surface into discrete areas, such as a plurality of squares or triangles. The boundary of each area is projected normal (e.g. perpendicular) to the first surface. The projection is normal to the surface at each point on the boundary of the area until the projection intersects a second opposing surface.

The cure kinetics may include determining pressure and temperature progressions that will result in the discrete element having satisfactory properties. Evaluating the cure kinetics of the discrete elements may include evaluating the effects of cure parameters according to dynamic mechanical analysis (DMA), thermogravimetric analysis (TGA), and differential scanning calorimetry (DSC).

At step 284, the model of the part 130 is sectioned into zones 158. The zones 158 may be generated by aggregating contiguous discrete elements that have similar cure kinetics, e.g., pressure requirements and/or temperature progressions within a specific tolerance of each other.

In some embodiments, aggregation of the discrete elements 158 into zones may include only an evaluation of the thickness of each discrete element. Thereby, each zone 158 includes a portion of the model of the part 130 having a minimum thickness and a maximum thickness within a predetermined tolerance of the average thickness of the zone 158. The tolerance may be a fixed value or may be a function of the average thickness of the zone. For example, one may use a multiple of the average thickness, a polynomial, an exponential function, another function, or some combination of functions of the thickness or average thickness.

The permitted tolerance between the maximum thickness and the average thickness may be different than the tolerance between the minimum thickness and the average thickness. Aggregation of the elements may be constrained such that the zones 158 are constrained to lie between planes perpendicular to the longitudinal axis 142 of the part 130. Other geometric constraints on the shape or size of the zones 158 may also be imposed.

At step 286, a temperature progression is calculated for each zone 158. The temperature progression may include evaluating the cure kinetics of each zone 158. It may include averaging or otherwise combining the time progression of the discrete elements forming the zone 158. In some embodiments, where the cure kinetics of each zone 158 are evaluated, the step 282 may be eliminated. Thereby, evaluation of the cure kinetics of the model of the part 130 is not performed prior to sectioning the model into zones 158. The temperature progression may include a temperature progression such as those illustrated in FIG. 9. These present a rise profile, dwell temperature and duration, and fall profile suitable for curing each zone 158 such that the cured zone 158 will have adequate material properties.

At step 288, a contour for the mold surface 150 of the outer mold 104 is calculated. The contour may precisely match an outer surface of the part 130. The calculation of the contour for the mold surface 150 may including generating a surface that matches an outer surface of the part 130 except for adjustments. Such adjustments may compensate for shrinkage, elastic spring back, a thickness of a release layer interposed between the mold surface 150 and the part 130, and other factors. One may consider any and all factors in the art of composite mold design known to affect the relationship between mold surface dimensions and the resulting surface dimensions of the cured part extracted from the mold surface.

At step 290, cure pressure requirements throughout the model 130 are calculated 290. Step 290 may include evaluating the cure pressure requirements of discrete elements of the model 130. It may include evaluating the pressure requirements for the zones 158. Step 290 may include extracting pressure requirement information from the cure kinetics calculated at step 282.

At step 292, a contour for the mold surface 152 of the heated layer 108 is calculated 292. The contour may precisely match an inner surface of the part 130. The calculation 292 of the contour for the mold surface 152 may include generating a surface that matches an inner surface of the part 130, except for adjustments. Adjustments may for example, compensate for shrinkage, spring back, a thickness of a release layer interposed between the mold surface 152 and the part 130, and other factors known in the art of composite mold design. One may adjust for such factors that may affect the relationship between mold surface dimensions and the resulting surface dimensions of the cured part extracted from the mold surface.

Step 294 includes calculating 294 the thickness of the heated layer 108 along the mold surface 152 needed to provide the required cure pressure over the part 130. Step 294 may include taking into account volumetric expansion of the heated layer 108 due to thermal expansion when subjected to the temperature progressions 286 calculated at step 286. Step 294 may include calculating 294 the dimensions of material forming the heated layer 108 needed to exert the required pressure at the curing temperature, and then calculating 294 shrinkage from the curing temperature to ambient. The shrunk dimensions may then be used as the manufacturing dimensions of the heated layer 108.

At step 294, an inner core contour 106 is calculated 294. The inner core contour 106 is the contour of the inner core that mates with the surface of the heated layer 108 opposing the mold surface 152. The inner core contour may be a function of the contour calculated 292 at step 292 and the thickness calculated 294 at step 294.

Figure 14:
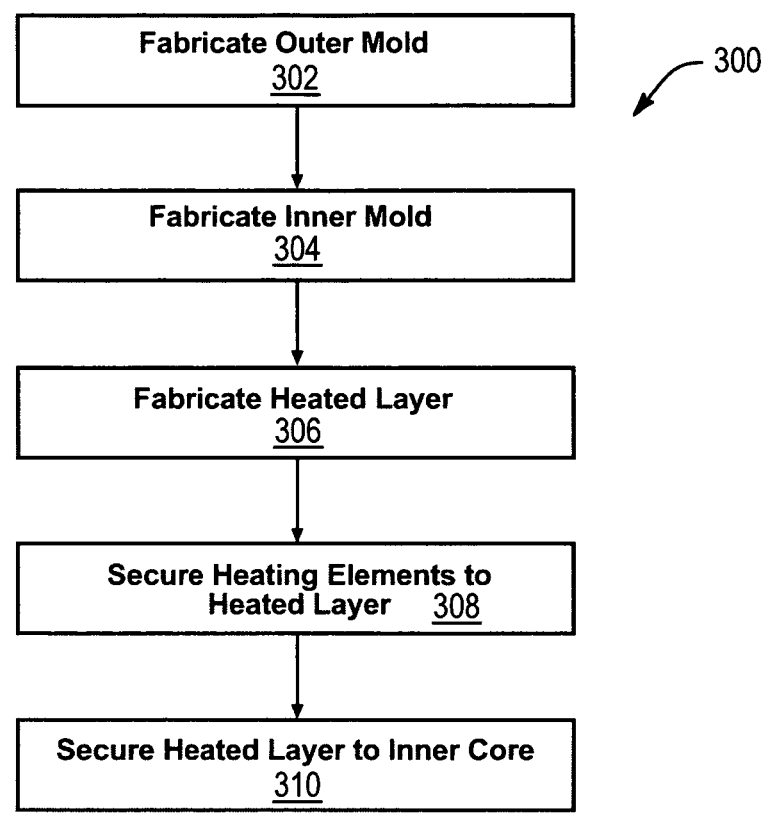
FIG. 14 is a process flow diagram of a method for manufacturing tooling for manufacturing composite parts having large and non-uniform thicknesses in accordance with the present invention.

FIG. 14 illustrates a method 300 for fabricating tooling 100 for manufacturing parts having large thickness, non-uniform thickness or any combination thereof. At step 302 the outer mold 104 is fabricated 302 having a mold surface 150 having the outer mold contour calculated 288 at step 288 of the method 280. Fabricating the outer mold 104 may include fabricating a carbon fiber composite shell having the mold surface 150 as one of the surfaces thereof and applying a rigid foam to an opposing surface thereof to reinforce the carbon fiber composite shell.

At step 304, the inner core 106 is fabricated 304. Fabricating 304 the inner core 106 at step 304 may include fabricating 304 a rigid part having an outer surface having the inner core contour calculated 294 at step 294. The inner core 106 may be made of steel, a rigid polymer, or a carbon fiber shell having an outer surface having the inner core contour and an opposing surface having a rigid foam secured thereto. The inner core 106 may be fabricated in separate pieces subsequently fastened to one another, such as is illustrated in FIGS. 10 and 11.

At step 306, the heated layer 108 is fabricated 306. Fabrication 306 of the heated layer 108 may include injection molding or machining a thermally expandable polymer such as silicone. That polymer may form a heated layer having one surface having the mold surface 152 contour calculated at step 292 and an opposing surface matching the inner core 106 contour calculated at step 296. At step 308 one or more heating elements are secured to 308 or embedded 308 in the heated layer 108. Steps 306 and 308 may be performed simultaneously by injection molding the heated layer 108 around the heating elements.

In some embodiments, the heated layer 108 may be fabricated in separate pieces with each piece corresponding to a zone 158. The heating element 160 for each piece may therefore be sized, placed or both in order to apply appropriate amounts of heat.

At step 310, the heated layer 108 is secured to the inner core 106. The inner core 106 has the surface of the heated layer 108 opposing the mold surface 152 aligned with the contour of the inner core 106. Thereby, the mold surface 152 has the proper dimensions for manufacturing the part 130. Where the inner core 106 includes separate pieces, step 310 may include registering and securing separate pieces of the heated layer 108 to corresponding pieces of the inner core 106. Thus, when pieces of the inner core 106 are secured to one another, the outer surfaces of the pieces of the heated layer 108 form a mold surface 152 corresponding to an inner surface of the part 130.

Figure 15:
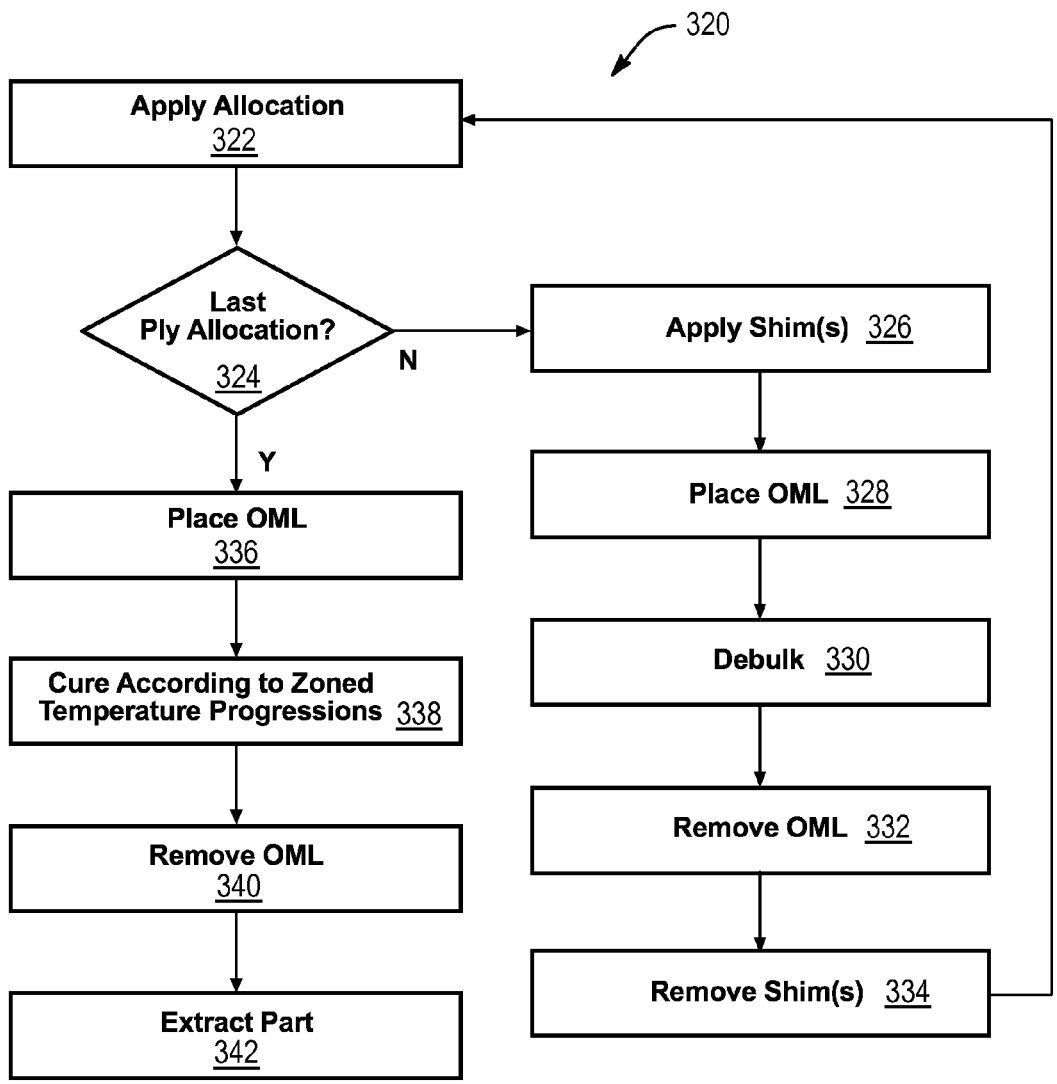
FIG. 15 is a process flow diagram of a method for manufacturing composite parts having large and non-uniform thicknesses in accordance with the present invention.

FIG. 15 illustrates a method 320 for fabricating 320 a part 130 having a large thickness, non-uniform thickness, or both. At step 322, a ply allocation 180 is applied 322 to the mold surface 152. The ply allocation 180 may include one or more plies of unidirectional or multidirectional fibers. The ply allocations 180 may be pre-pregnated with resin, or resin may be applied to the fibers before or after placement. Before applying the first ply, a release layer may be placed over the mold surface 152.

Step 324 includes evaluating 324 whether the ply allocation 180 is the last ply allocation. If not, then, at step 326, a shim is applied 326 over the ply allocation 180 and any preceding ply allocations 180. The shim may be the same size as, or larger than, the portion of the cavity 154 not occupied by the one or more ply allocations 180 and any release layer. The shim may be breathable to enable outgassing. It may also be flexible and elastic in order to bias the allocations against the mold surface 152. The shim may include multiple layers, such that a layer may be removed from the shim for each ply allocation 180 or number of ply allocations 180 in order to size the total shimming for occupation of the remaining volume of the cavity 154.

At step 328, the outer mold 104 is placed 328 over the ply allocations 180 and shim 190. The mold 104 may urge the shim against the ply allocations 180 in order to compress the plies. The outer mold 104 may include multiple pieces such that step 328 may include fastening the pieces to one another or placing an outer fixture to hold the pieces together. Step 328 may also include placing 328 a fixture around the outer mold 104 in any case in order to prevent outward deflection of the outer mold 104.

Step 330 includes—debulking 330 the ply allocations 180 within the mold cavity 154. The debulking step 330 advantageously forces air out of the plies and from between the plies. The debulking step 330 advantageously compresses each ply allocation 180 as it is applied, thus reducing the amount of shifting or wrinkling that tends to result in laminates having large thicknesses with large numbers of plies not compressed until the final curing step. The debulking step 330 may include applying both heat and pressure, such as by activating the heating elements 160 in thermal contact with the heated layer 108. The debulking step 330 may include a "green curing" step as known in the art of composite manufacture. At step 332, the outer mold 104 and the shim 190 dare removed 332, 334.

Flow of execution then returns to step 322 and the next ply allocation 180 is applied 322. If at step 324, it is determined that the ply allocation 180 applied during the most recent iteration of step 322 is the last ply allocation, then, at step 336, the outer mold 104 is placed 336 over the ply allocations 180. The outer mold 104 may include multiple pieces such that step 336 may include fastening 336 the pieces to one another or placing 336 an outer fixture to hold the pieces together. Step 336 may also include placing 336 a fixture around the outer mold 104 in any case in order to prevent outward deflection of the outer mold 104.

Step 336 may include placing a release layer between the outer mold 104 and the outermost ply of the ply allocations 180. At step 338, the ply allocations 180 are cured 338 by activating the heating elements 160 according to the calculated temperature progressions for each zone 158, as discussed hereinabove. At step 340, the outer mold 104 is removed 340 and the cured part 130 is extracted 342 at step 342.

Figure 16:
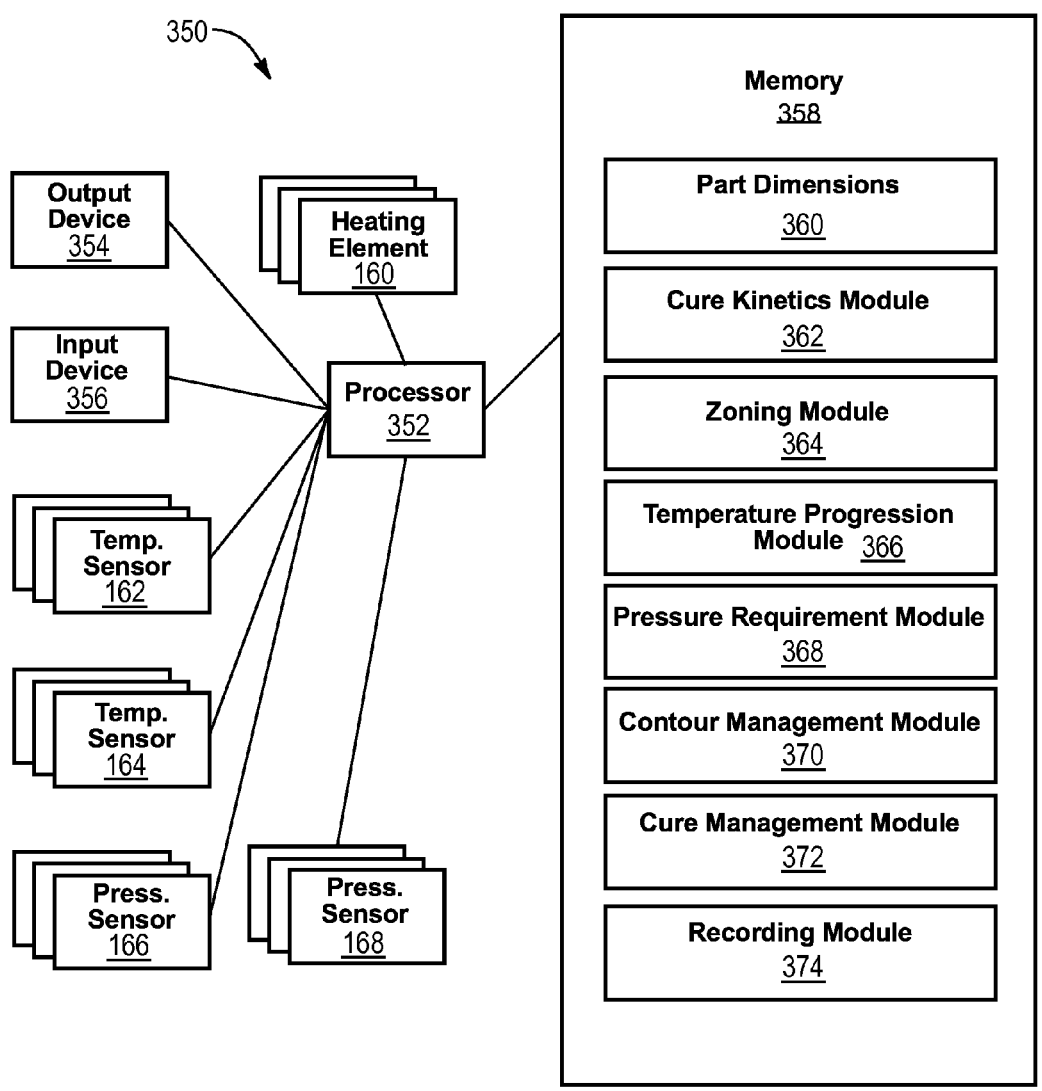
FIG. 16 is a schematic block diagram of a computer system for facilitating manufacturing composite parts having large and non-uniform thicknesses in accordance with the present invention.

FIG. 16 illustrates a computer system 350 for designing and controlling tooling 100 for manufacturing a part 130 having a large thickness 130, non-uniform thickness, or both. The system 350 includes a processor 352 operable to execute executable data and operate upon operational data. The processor 352 may receive signals from the thermal sensors 162, thermal sensors 164, pressure sensors 166, and pressure sensors 168. The processor 352 may additionally be operably coupled to the heating elements 160 and issue activating signals to the heating elements 160.

The processor 352 may additionally be operably coupled to one or more input devices 354 such as a mouse, keyboard, touch screen, or the like. The processor 352 may be operably coupled to one or more output devices 356 such as a display, printer, network, or the like.

The processor 352 is operably coupled to a memory 358 storing operational and executable data. The operational and executable data may include part dimensions 360, a cure kinetics module 362, a zoning module 364, a temperature progression module 366, a pressure requirement module 368, and a contour calculation module 370, each controlling its correspondingly named process.

The part dimensions 360 include data describing the dimensions of a part for which tooling 100 is to be designed. The data may include dimensions and tolerances specified as known in the art of manufacturing sufficient to characterize the geometry of a given part.

The cure kinetics module 362 calculates the cure kinetics for the model specified by the part dimensions 360. Calculating the cure kinetics may include calculating cure kinetics for discrete elements on the scale of a finite element analysis of the model. Alternatively, the cure kinetics may be calculated for zones of the model as determined by the zoning module 364. The cure kinetics may include evaluating curing of a part having the dimensions of the model using dynamic mechanical analysis (DMA), thermogravimetric analysis (TGA), and differential scanning calorimetry (DSC).

The zoning module 364 divides the model into distinct zones 158. The model may be divided into zones 158 such that each zone 158 has a minimum thickness and a maximum thickness within a predetermined tolerance of the average thickness of the zone 158. The tolerance may be a fixed value or may be a function of the average thickness of the zone 158, such as a multiple of the average thickness or a polynomial, exponential function, other function, or combination function of the thickness or average thickness.

The permitted tolerance between the maximum thickness and the average thickness may be different than the tolerance between the minimum thickness and the average thickness. The zones 158 may be constrained to lie between parallel planes. The parallel planes may be constrained to be perpendicular to a longitudinal axis, or some other axis, of the model, such as the longitudinal axis 142 of the part 130. Other geometric constraints on the shape or size of the zones 158 may also be imposed.

The temperature progression module 366 calculates a temperature progression for each zone 158 of the model, such as a temperature progression illustrated in FIG. 9 having a rise profile, dwell temperature and duration, and fall profile suitable for curing each zone 158. The pressure requirement module 368 calculates a pressure requirement for discrete areas throughout the module, such as differential elements on the scale of finite element analysis or larger. The discrete elements may be columns of material of constant or non-constant cross-section extending between inner and outer surfaces, or other pairs of opposing surfaces, of the model.

The contour calculation module 370 calculates the contours of the mold surface 150, mold surface 152, an outer surface of the inner core 106, and a mating surface of the heated layer 108 secured to the inner core 106. The contour of the mold surface 150 may be calculated as a function of the outer surface of the model with allowances for spring back (e.g. elastic recovery), shrinkage, and the thickness of any release layer. Likewise, the contour of the mold surface 152 may be a function of the inner surface of the model with allowances for spring back, shrinkage, and the thickness of any release layer.

The contour of the mating surface of the heated layer 108 secured to the inner core 106 may be a function of the pressure requirements calculated by the pressure requirement module 368. The contour of the mating surface and the thickness between the mold surface 152 and the mating surface may be selected such that thermal expansion of the heated layer 108 during curing will cause sufficient pressure to be exerted on plies located between the mold surfaces 150, 152 as determined by the pressure requirement module 368.

The memory 358 may additionally include a cure management module 372 and a recording module 374. The cure management module 372 and 374 may reside in the same memory 358 and be processed by the same processor 352 as the other modules of FIG. 16 or may reside in a separate memory 358 and be executed by a different processor 352, such as a memory and processor 352 located within a fabrication facility collocated with the tooling 100.

The cure management module 372 may activate the heating elements 160 according to feedback from one or more of the thermal sensor 162, thermal sensor 164, pressure sensor 166, and pressure sensor 168. This information may be used to control temperature, pressure, or both exerted on each zone 158 to be within a tolerance of the temperature progressions and pressure requirements calculated by the temperature progression module 366 and pressure requirement module 368, respectively.

The outputs of one or more of the thermal sensor 162, thermal sensor 164, pressure sensor 166, and pressure sensor 168 may be stored throughout the curing process in a recording module 374. Thereby, post-curing evaluation of the curing process may enable improvement of the curing process and evaluation of how closely the actual curing process, including temperature progressions and pressures, adhered to nominal temperature progressions and pressure requirements.

The modules illustrated in FIG. 16 as being stored in the memory 358 may also be stored on a computer-readable storage medium such as a hard disc, compact disc, DVD, flash memory, RAM, ROM, or the like. The modules illustrated in FIG. 16 as being stored in the memory 358 may include computer-usable program code such as executable and operational data.

Figure 17:
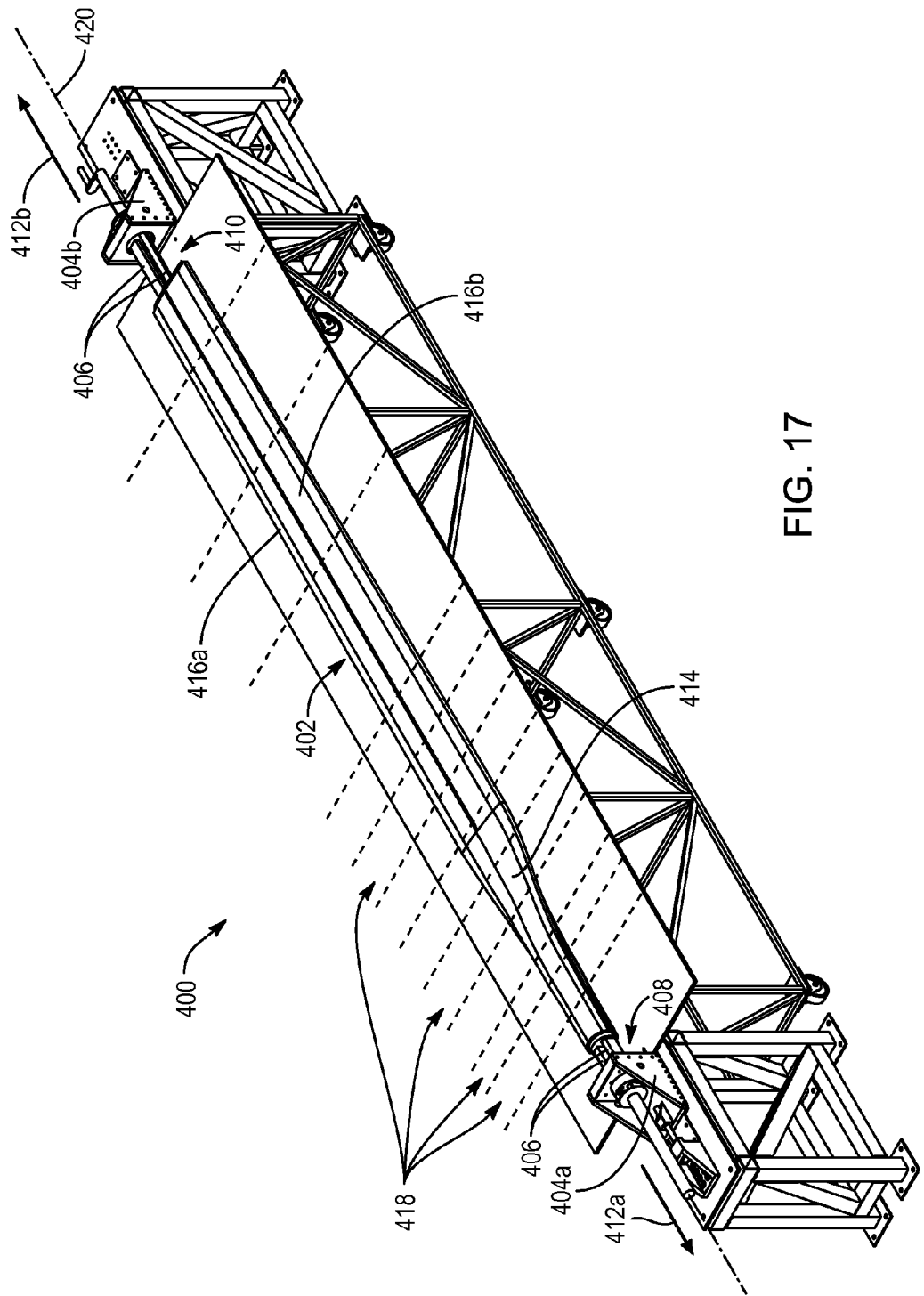
FIG. 17 is an isometric view of tooling for manufacturing a composite rotor blade in accordance with the present invention.

Referring to FIG. 17, the foregoing apparatus and methods may be used in the manufacture of a blade 42 for use in a rotorcraft, such as the aircraft 10. In such applications, tooling 400 for manufacturing the blade 42 may include an inner mold 402 defining the contour of an inner surface of a blade spar forming part of the blade 42.

The inner mold 402 may perform functions and have the structure ascribed to the rigid core 106 and heated layer 108 in the above described apparatus and methods. The inner mold 402 may be rotatably secured to mounts 404a, 404b to enable turning of the inner mold 402 to place composite plies on opposing surfaces thereof. The inner mold 402 may secure directly to the mounts 404a, 404b or may attach to the mounts 404a, 404b by means of one or more support rods 406 passing therethrough.

The support rods 406 may also secure at the proximal end 408 and distal end 410 of the inner mold rather than passing therethorugh or may extend only partially through the inner mold 402. Opposing tensile forces 412a, 412b may be exerted on at least one of the support rods 406 and the inner mold 402 in order to prevent sagging of the inner mold 402 due to its own weight and that of uncured composite material placed thereon.

The inner mold 402 may include a root portion 414 and two branch portions 416a, 416b. The root portion 414 extends from the proximal end 408 partially toward the distal end 410. The branch portions 416a, 416b secure to the root portion 414 and extend partially or completely from the root portion 414 to the distal end 410.

The inner mold 402 may be physically or logically divided into zones 418, corresponding to the zones 158 of the apparatus and methods described hereinabove. Each zone 418 may be embodied as a zone 158 of FIG. 4 and may therefore include one or more independently activated heating elements 160, thermal sensors 164, and pressure sensors 168 having the structures and operated according to the methods described hereinabove. The zones 418 may be defined by boundaries generally perpendicular to the longitudinal axis 420 of the blade 42, or by some other suitable boundary.

As in the apparatus and methods described hereinabove, the zones 418 may correspond to regions of the uncured blade spar having maximum thickness and minimum thickness within a tolerance of the average thickness of the region. The tolerance may be a fixed value, fixed percentage, or a function of the average thickness. The tolerance between the minimum thickness and the average thickness and the tolerance between the maximum thickness may be unequal. In some embodiments, the regions are defined as a region in which the difference between the minimum and maximum thicknesses is within a fixed or mathematically determined tolerance.

Figure 18:
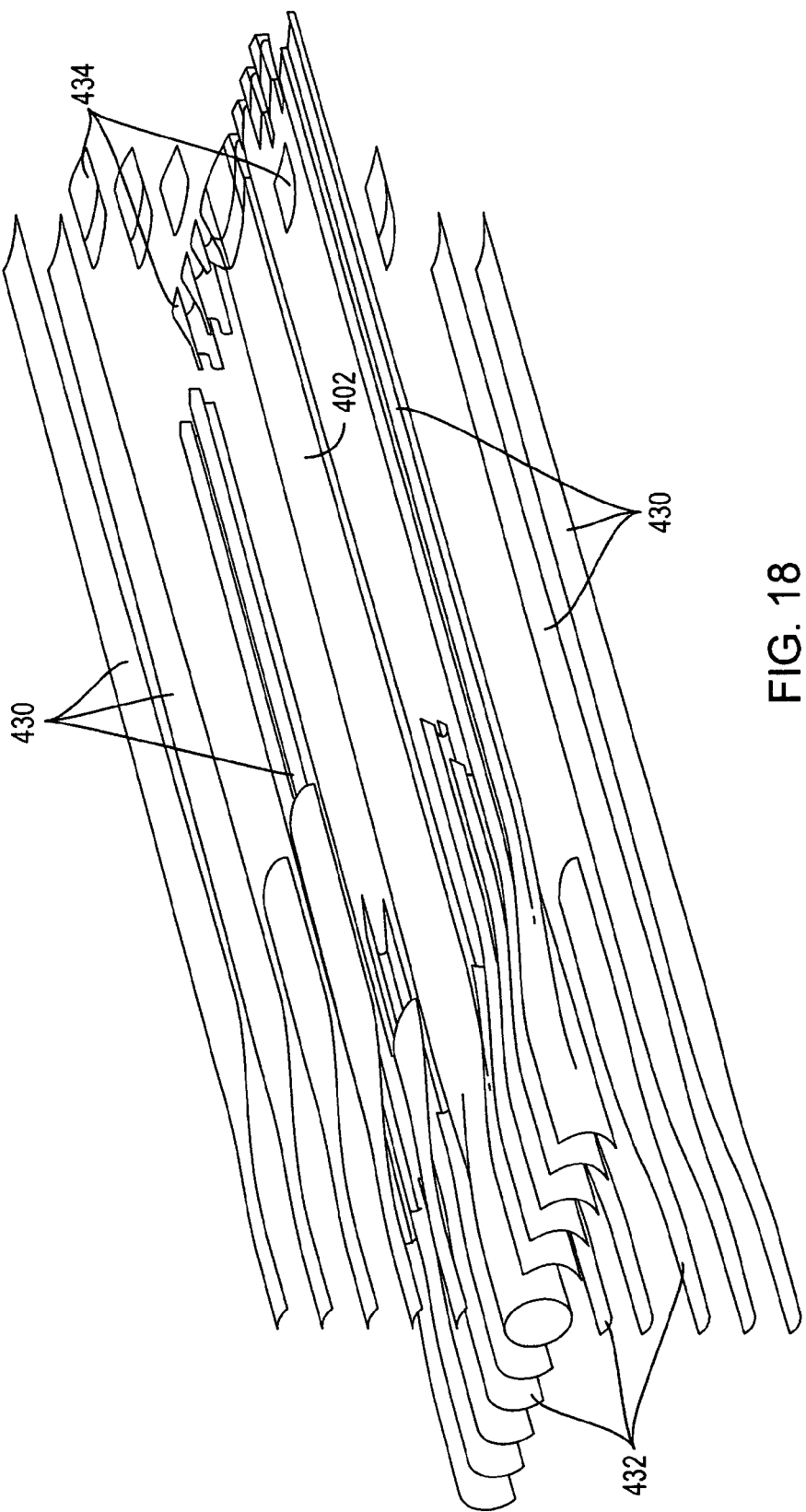
FIG. 18 is an isometric view of ply allocations for forming a composite rotor blade in accordance with the present invention.

Referring to FIG. 18, a plurality of ply allocations 180 may be applied to the inner mold 402. As in other embodiments described herein, the ply allocations 180 may include one or more composite plies. The plies may be pre-impregnated with resin or may be combined with resin by painting resin onto the plies once laid or by injecting resin over the plies. As for the apparatus and methods described hereinabove, each ply allocation 180 may be debulked before a subsequent ply allocation is applied thereover.

The illustrated ply allocations 180 merely illustrate a proportional number of different lengths and configurations of ply allocations 180. Accordingly, each illustrated ply allocation 180 may represent one or more actual ply allocations. The ply allocations 180 in FIG. 18 are sectioned into upper, lower, leading, and trailing sections in order to provide an exploded view of the ply allocations 180. However, the actual ply allocations 180 are not all sectioned as illustrated. The ply allocations may also extend circumferentially around the inner mold 402 having the fibers thereof at a variety of angles with respect to the longitudinal axis 420 in order to achieve a desired flexural strength profile along the length of the blade spar and to achieve a suitable frequency response.

The ply allocations 180 may include full length ply allocations 430 extending substantially an entire distance between the proximal and distal ends 408, 410. The ply allocations 180 may include partial ply allocations 432 extending from the proximal end 408 partially toward the distal end 410. As is apparent from FIG. 18, the partial ply allocations 432 are more numerous than the full length ply allocations 430 in order to accommodate the larger bending moments at the root of the blade 42 and to provide sufficient material to receive fasteners securing the blade 42 to the hub 44.

The ply allocations 180 may further include partial ply allocations 434 extending from the distal end 410 partially toward the proximal end 408. As is apparent, the partial ply allocations 434 are more numerous than the full length ply allocations 430, but less numerous than the partial ply allocations 432. The partial ply allocations 434 may increase the thickness of material at the tip of the blade 42 to facilitate the attachment of the tip jet 50 to the blade 42. Partial ply allocations 432, 434 may have rounded ends to reduce stress concentrations due to longitudinal bending loads that might otherwise result from an abrupt change in thickness.

Figure 19A:
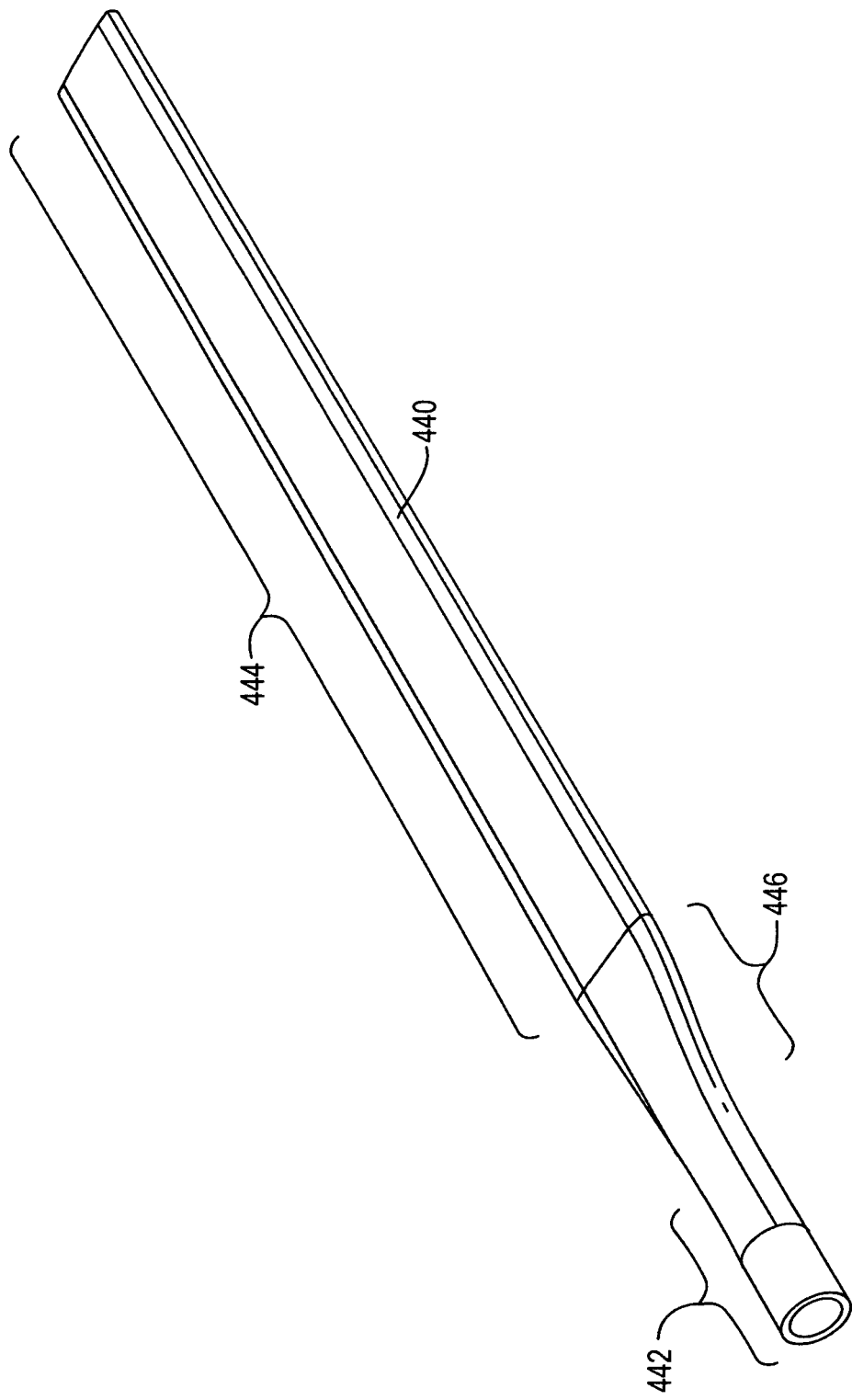
FIG. 19A is an isometric view of a composite blade spar in accordance the present invention.

Referring to FIG. 19A, a blade spar 440 formed using the tooling 400 may have a root portion 442, a blade portion 444, and a transition portion 446. Referring to FIG. 19B, the root portion 442 has a cylindrical cross section with a wall thickness 450. The wall thickness may be non-uniform along the root portion 442. Referring to FIG. 19C, the blade portion 444 is embodied as a hollow box having a wall thickness 452. The hollow portion of the blade portion 444 may serve as the blade duct 60 for transmitting compressed air from the hub 44 to the tip jets 50.

The transition portion 446 has a cross section smoothly transitioning from the cross section of the root portion 442 to that of the blade portion 444. The wall thickness 452 of the blade portion may be non-uniform along the length of the blade portion 444 and may be non-uniform around the circumference of the blade portion 444. The maximum value of the wall thickness 450 is substantially greater than the maximum value of the wall thickness 452. In some embodiments, the maximum wall thickness 450 is between about four and about ten times the minimum wall thickness 452.

The blade portion 444 may have upper and lower surfaces 454, 456 having a contour corresponding to a portion of an airfoil contour 458. The lateral walls 460 may be substantially perpendicular to the chord of the air foil contour 458 and be offset inwardly from the leading and trailing edges of the airfoil contour. As known in the art of propeller and rotor design, the chord of an air foil is advantageously twisted along the length of the propeller or rotor blade in order to balance and increase the overall lift or thrust generated by the propeller or rotor. Accordingly, the upper and lower surfaces 454, 456 may have a helical or twisted shape and the lateral walls 460 may have corresponding helical or twisted shape.

Figure 20:
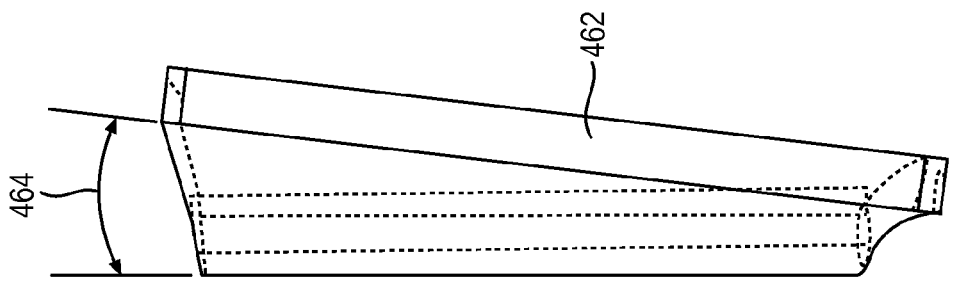
FIG. 20 is a front elevation view of a shear web in accordance with the present invention.

Referring to FIG. 20, while still referring to FIG. 19C, the blade portion 444 may have a shear web 462 extending across the blade duct 60 defined by the blade portion 444. The shear web may extend completely or partially along the length of the blade portion 444. The shear web 462 may be generally parallel to the side walls 460. In embodiments, where the side walls 460 have a helical or twisted shape, the shear web 462 may have a corresponding helical or twisted shape. In the illustrated embodiment, the shear web 462 has a twisted planar or helical shape, such that the shear web 462 has a total twist angle 464 between its ends. In some embodiments, the twist angle 464 is between about five and ten degrees.

Figure 21:
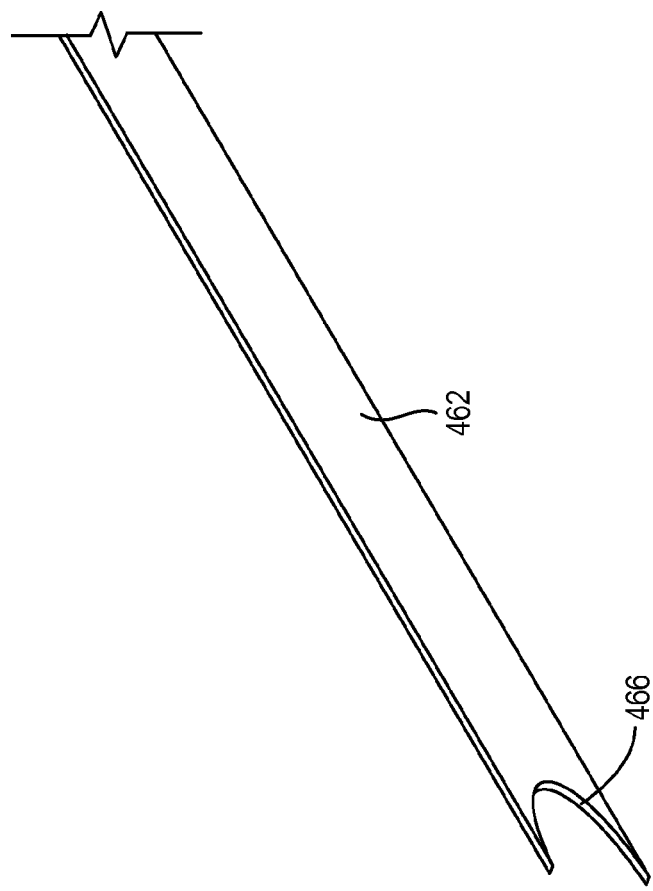
FIG. 21 is an isometric view of a portion of a shear web in accordance with the present invention.

Referring to FIG. 21, the shear web 462 may include circular or elliptical cutouts 466 at one or both ends thereof. The cutouts 466 may provide a gradual transition in stiffness between the portion of the blade portion 444 reinforced by the shear web 462 and portions that are not. Such a gradual transition may advantageously reduce stress concentrations.

Figure 22:
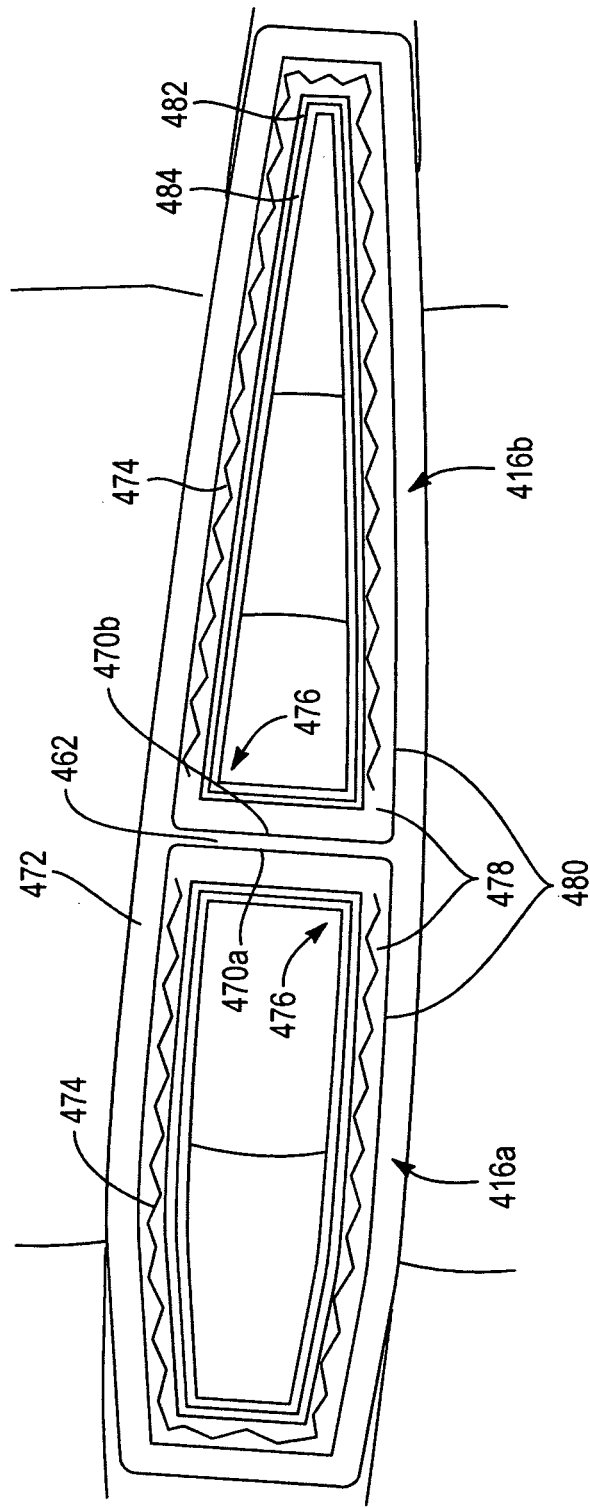
FIG. 22 is a side elevation cross-sectional view of an uncured blade spar placed on an inner mold in accordance with the present invention.

Referring to FIG. 22, the shear web 462 may be incorporated into the blade spar 440 by first placing the shear web 462 between the branches 416a, 416b of the inner mold 402. The branches 416a, 416b may include walls 470a, 470b, respectively, that are generally parallel to one another and engage the shear web 462. In embodiments where the shear web 462 has a twisted or helical shape, the walls 470a, 470b may have a corresponding twisted or helical shape, including a substantially identical twist angle 464, as shown in FIG. 20. The shear web 462 may partially or completely occupy a gap between the branches 416a, 416b.

Following placement of the shear web 462, the ply allocations 180 may be placed around the inner mold 402, including the branches 416a, 416b and shear web 462, such as according to the methods described hereinabove. The ply allocations 180 form an uncured blade spar skin 472. The shear web 462 may be sized such that the edges thereof contact the uncured blade spar skin 472 prior to curing or may be separated by a small tolerance from the blade skin 472. During curing, melting and cross linking of resin within the shear web 462 and uncured blade skin 472 causes co-curing, or bonding, between the blade skin 472 and shear web 462.

The shear web 462 may advantageously have a significantly larger structural stiffness than the blade spar skin 472 following curing. The shear web 462 may also be cured prior to placement between the branches 416a, 416b. In this manner, the shear web 462 may be manufactured, inspected, and its quality verified prior to placement in the blade spar 440 where its internal placement would make it difficult to inspect.

In embodiments where the structural stiffness of the shear web 462 is significantly greater than that of the cured blade skin 472, a blade spar 440 having structural properties within tolerance may be achieved with higher repeatability inasmuch as the properties of the blade skin 472 are less significant and therefore variation in the manufacturing process of the blade skin 472 are also less significant.

In some embodiments, the shear web 462 has a section modulus that is between about 1.5 and 10 times larger than that of the blade spar skin 472 without the shear web 462. In some embodiments, the shear web 462 may have a section modulus between about 50 and about 90 percent of the section modulus of the final blade spar 440. In a certain preferred embodiment, the section moduli of the shear web 462, blade skin 472, and final blade spar 440 are calculated using the chord of the final blade airfoil contour 458 as the neutral axis.

In embodiments where the shear web 462 is cured prior to placement between the branches 416a, 416b, the heating elements 160 may be embodied as heating elements 474 that are coextensive with an outer surface of the branches 416a, 416b, except for the walls 470a, 470b adjacent the shear web. In this manner, the shear web 462 will not be significantly heated, which could otherwise result in over-curing and degradation in strength. Each heating element 474 may be a single heating element or include multiple heating elements having the illustrated distribution.

The inner mold 402 may include a rigid core 476 and heated layer 478 corresponding to the rigid core 106 and heated layer 108, respectively, described hereinabove and may have any or all of the attributes of the rigid core 106 and heated layer 108 described hereinabove. The heated layer 478 may define an inner mold surface 480 defining the inner surface of the final blade spar 440. The heating elements 474 of each zone 418 may be at least one of embedded in the heated layer 478, positioned between the heated layer 478 and the rigid core 476, and embedded in the rigid core 106.

The rigid core 476 may include one or more layers and be constructed of combinations of various materials including steel, rigid polymers, and the like. In certain embodiments, the rigid core 476 includes a carbon fiber composite layer 482 and a rigid foam reinforcing layer 484. The carbon fiber composite layer 482 advantageously has comparatively high strength and comparatively light weight compared to other composites, which reduces sagging during the lay-up and curing processes. The carbon fiber composite layer 482 also advantageously has a comparatively low coefficient of thermal expansion, which provides better dimensional stability.

Figure 23:
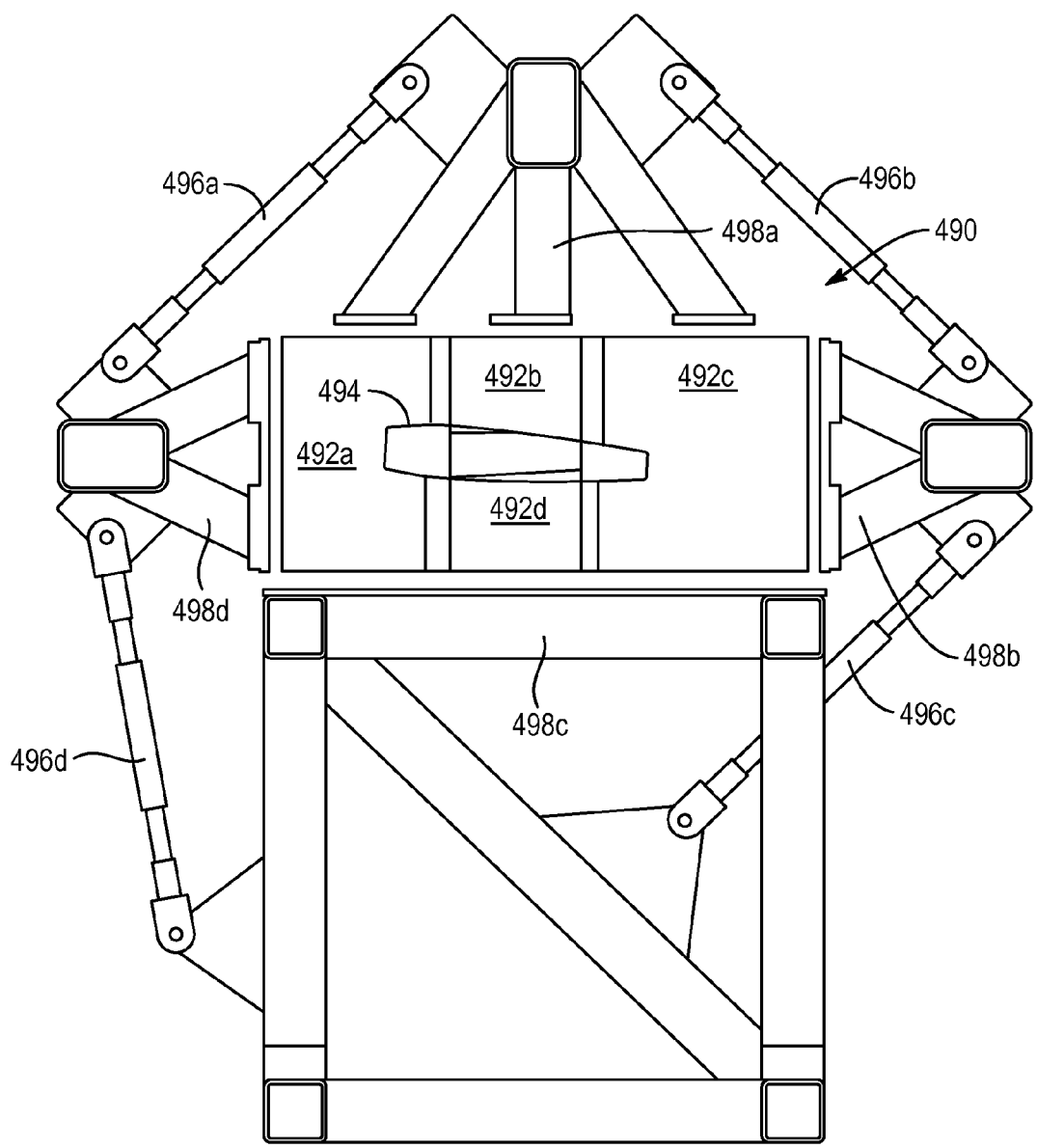
FIG. 23 is a side elevation view of an outer mold and fixtures for retaining an outer mold in accordance with an embodiment of the present invention.

Referring to FIG. 23, in some embodiments, the uncured blade spar 440 and inner mold 402 may be placed within an outer mold 490 during curing. In an alternative embodiment, the uncured blade spar 440 and inner mold 402 may be placed within a vacuum bag and air drawn out of the vacuum bag in order to apply pressure to the uncured blade spar 440. A release layer may be interposed between the uncured blade spar 440 and the outer mold 490.

In a like manner, a release layer may be positioned between the uncured blade spar 440 and the inner mold 402. The outer mold 490 may include multiple mold sections 492a, 492b, 492c that combined form a mold surface 494 defining the outer surface of the cured blade spar 440. The mold surface 494 and the mold surface 480 of the inner mold 402 define a mold cavity having the shape of the rotor blade spar 440, such as the rotor blade 440 illustrated 19A-19C.

As such, the cavity defined by the mold surfaces 494, 480, has a non-uniform thickness corresponding to the wall thickness 450 of the root portion 442 and the wall thickness 452 of the blade portion 444. The outer mold 490, heated layer 478, and rigid core 476 may be designed and fabricated in view of the desired final part geometry of the blade spar 440 according to the methods 280, 300 described hereinabove.

Pressure may be applied to the mold sections 492a, 492b, 492c, 492d to prevent separation during the curing process. As noted hereinabove, the heated layers 108, 478 are formed of thermally expandable material. The thermally expandable material may undergo an expansion by volume of up to or exceeding about 20 percent. Accordingly, the application of pressure resists the tendency of the heated layers 108, 478 to expand and increase the pressure exerted on the uncured blade spar 440 in order to promote consolidation of separate plies of composite material.

Any apparatus and method known in the art for securing sections of an outer mold may be used, including methods used in the art of composite manufacturing, polymer injection molding, metal casting, and the like. In the illustrated embodiment, a plurality of tensioning elements 496a-49bd are each coupled between adjacent pressure distribution structures 498a-498d.

Each pressure distribution structure 498a-498d engages a surface of the outer mold 490 and exerts an inward pressure thereon. The tensioning elements 496a-496d may be embodied as hydraulic pistons and cylinders, turnbuckles, ratchet load binder, or any other tensioning system known in the art may be used.

Figure 24:
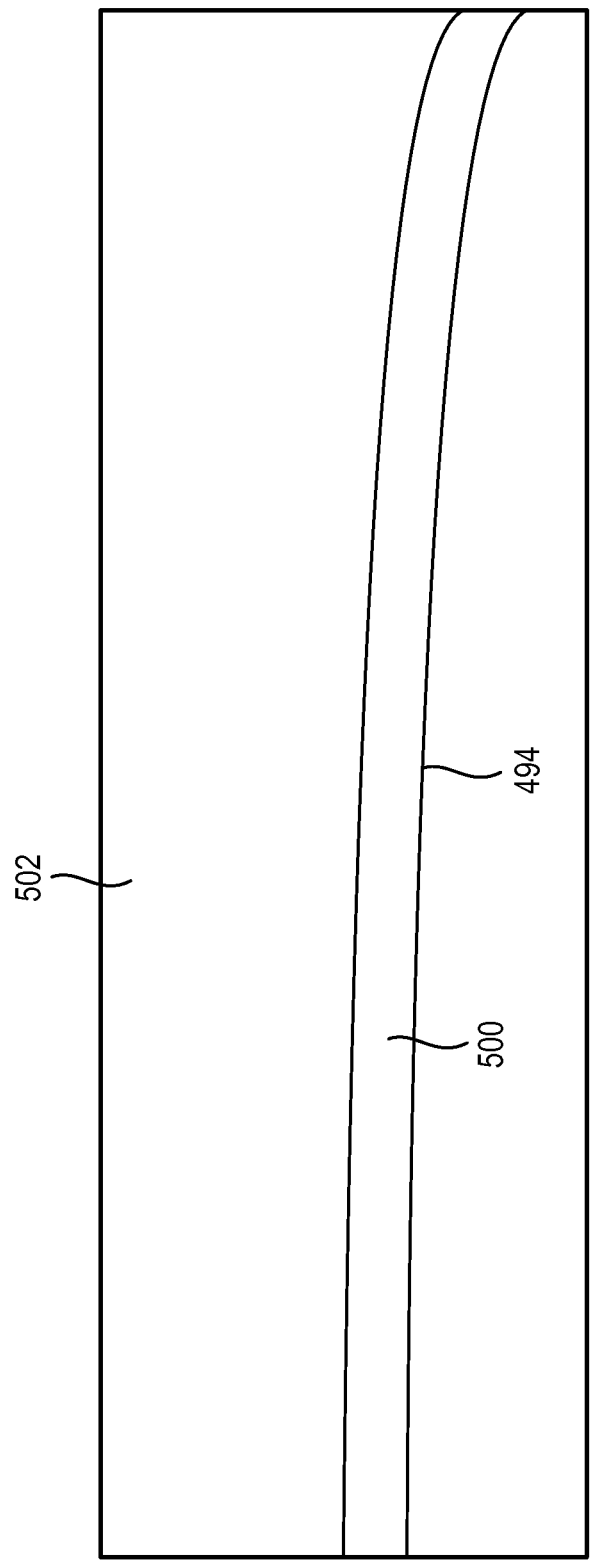
FIG. 24 is a cutaway side elevation cross-sectional view of a section of an outer mold in accordance with the present invention.

FIG. 24 illustrates a mold section 492a. However, the following discussion relates to each of the mold sections 492a-492d. The mold sections 492a-492d may include a carbon fiber composite layer 500 and a rigid foam layer 502 secured to the carbon fiber composite layer 500. The mold surface 494 may be formed by the carbon fiber composite layer 500. The carbon fiber composite layer 500 advantageously has high strength and light weight, which reduces sagging during the lay-up and curing process. The carbon fiber composite layer 500 also advantageously has a low coefficient of thermal expansion, which provides better dimensional stability.

Figure 25:
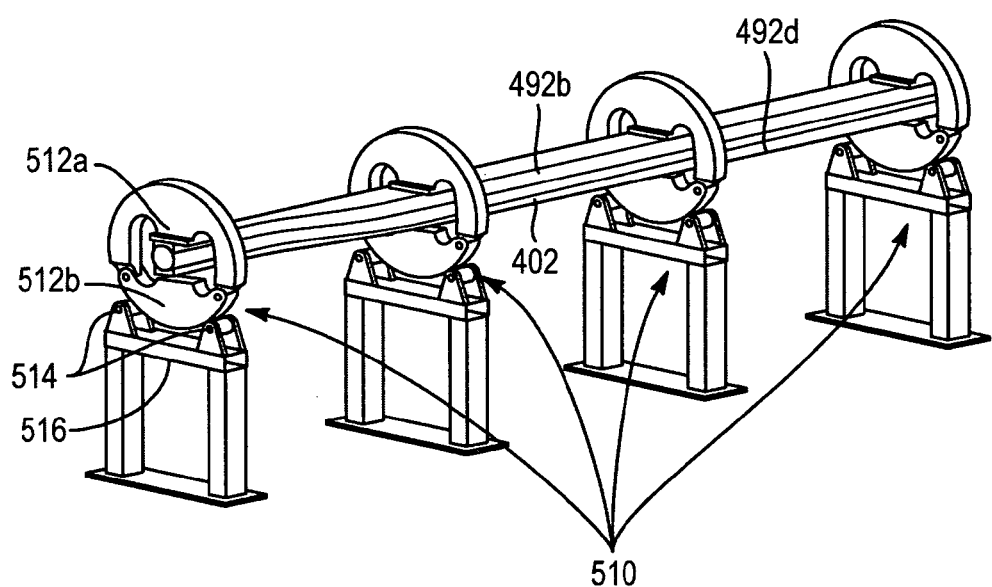
FIG. 25 is an isometric view of fixtures for supporting an inner mold during ply lay up in accordance with the present invention.

Referring to FIG. 25, one or more of the mold sections 492b, 492d may be used during the lay up process to support the inner mold 402. In the illustrated embodiment, a plurality of rotating mounts 510 support the inner mold 402. Each mount 510 may include mounting ring sections 512a, 512b that are hingedly secured to one another and openable to enable placement of the inner mold 402 therebetweeen and the placement of ply allocations 180. The mounting ring sections 512a, 512b combine to form a circular outer perimeter that rests on rollers 514 rotatably mounted to supports 516.

In some embodiments, the mold sections 492b, 492d are placed on opposing sides of the inner mold 402 and any ply allocations 180 placed thereon. The mounting ring sections 512a, 512b when closed and secured together may clamp the mold sections 492b, 492d to the inner mold 402 and hold the mold sections 492b, 492d, inner mold 402, and any ply allocations 180 in place.

Once clamped, the mold sections 492b, 492d, inner mold 402, and any ply allocations 180 may be rotated to a different position. The mounting ring sections 512a, 512b may then be opened and the uppermost mold section 492, 492b removed in order to enable placement of a ply allocation 180 on an opposite side of the inner mold 402.

The presence of the mold sections 492b, 492d stiffens the assembly and resists sagging of the inner mold 402 and consequent wrinkling or stretching of the ply allocations 180 placed thereon. In some embodiments, one or more shims 190 as described hereinabove may be interposed between the mold sections 492b, 492d and the ply allocations 180 for intermediate ply placement steps before the placement of the final ply allocations, inasmuch as the mold sections 492b, 492d may have mold surfaces corresponding only to the final blade spar geometry.

Figure 26:
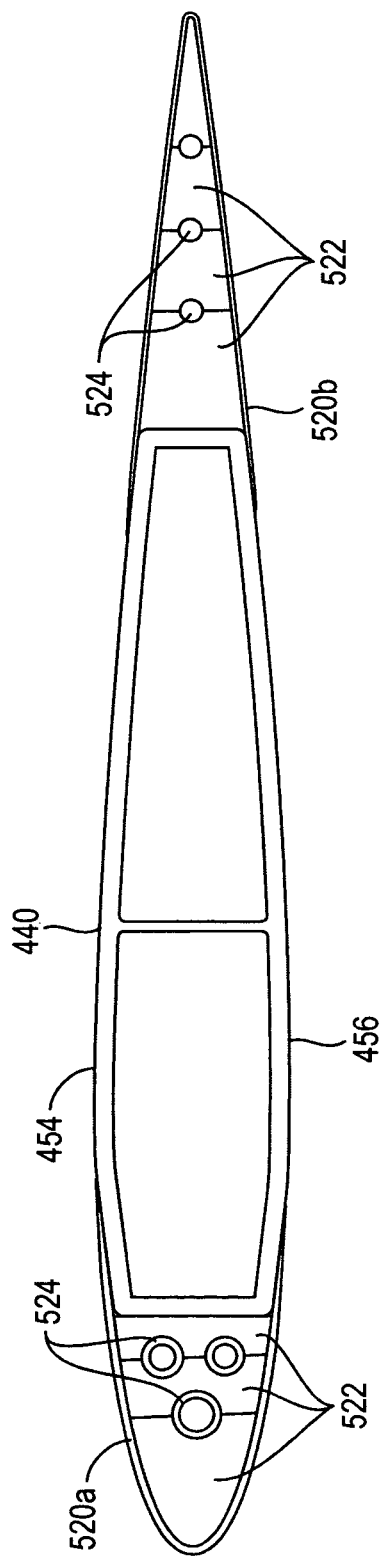
FIG. 26 is a front elevation cross-sectional view of a blade spar having leading and trailing edge fairings secured thereto in accordance with the present invention.

Referring to FIG. 26, as noted above, the upper surface 454 and lower surface 456 of the blade spar 440 form a portion of an airfoil contour 458. In some embodiments, a leading edge fairing 520a and a trailing edge fairing 520b secure to leading and trailing edges, respectively, of the blade spar 440 in order to form a blade 42 having a complete airfoil contour.

The leading and trailing edge fairings may be secured to the blade spar 440 by means of adhesives. Alternatively, uncured leading and trailing edge fairings 520a, 520b may be positioned on a cured or uncured blade spar 440. Heat and pressure may then be applied sufficient to cure the leading and trailing edge fairings 520a, 520b. During the curing process, cross-linking and other bonding forces may be created between the leading and trailing edge fairings and the blade spar 440.

In some embodiments, a thermally expandable material 522 may be positioned within the leading and trailing edge fairings 520a, 520b. In such embodiments, the thermally expandable material 522 may expand during the co-curing process to ensure proper pressure is applied to the leading and trailing edge fairings to enable proper curing and ply consolidation of the leading and trailing edge fairings 520a, 520b.

In some embodiments, lines 524 are routed through one or both of the fairings 520a, 520b. The lines 524 may include one or more of cables, electrical lines, hydraulic or fuel lines, or the like, for controlling the tip jets 50 or control surfaces on the blade 42.

The leading and trailing edge fairings 520a, 520b may have significantly lower structural stiffness than the blade spar 440. For example, the leading and trailing edge fairings 520a, 520b may have individual section moduli that between about five and 35 percent the section modulus of the blade spar 440.

Alternatively, the blade spar 440 without the leading and trailing edge fairings 520a, 520b may have a section modulus that is between about 60 and 95 percent of the section modulus of the blade spar 440 having the leading and trailing edge fairings 520a, 520b secured thereto either by co-curing or adhesive bonding. In a preferred embodiment, the section modulus of the blade spar 440, leading and trailing edge fairings 520a, 520b, and the assembled blade 42 may be calculated using the chord of the blade 42 as the neutral axis.

Figure 27:
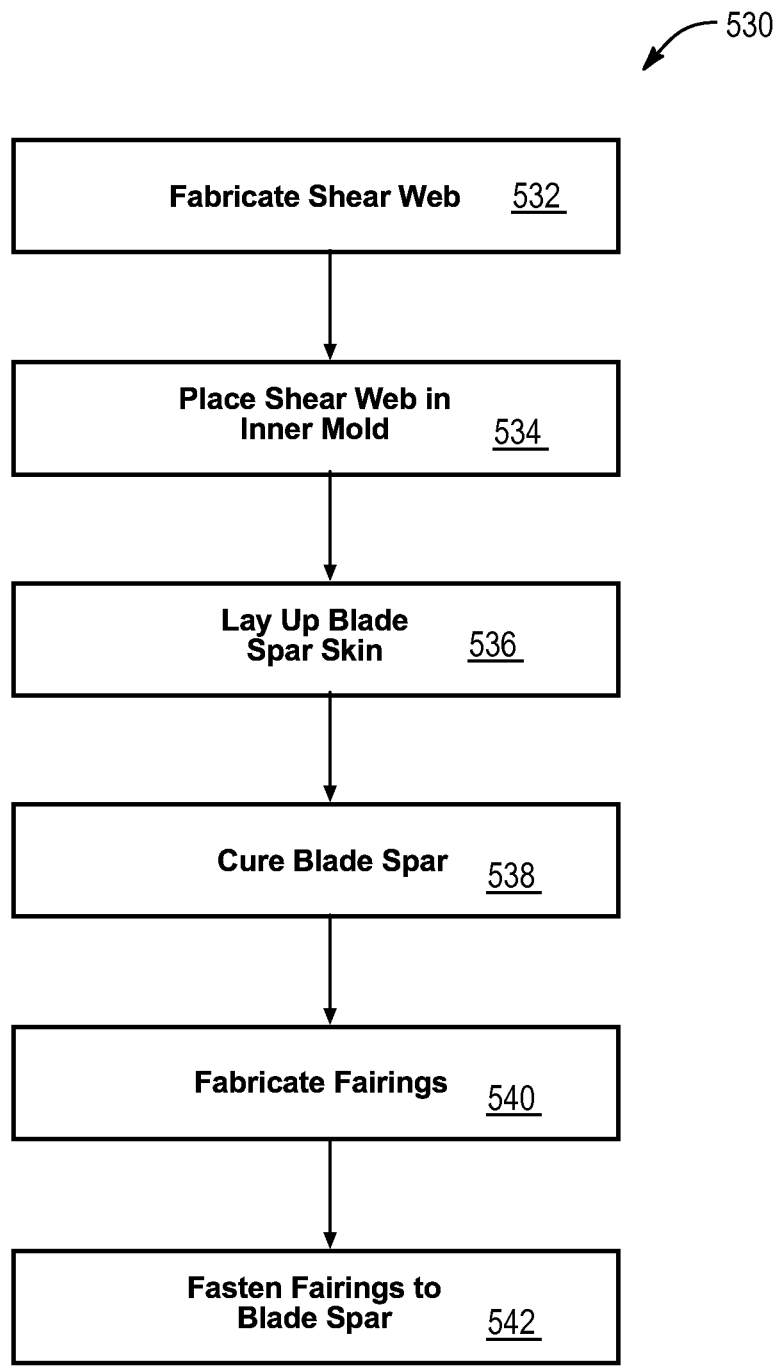
FIG. 27 is a process flow diagram of a method for manufacturing a composite rotor blade spar in accordance with the present invention.

Referring to FIG. 27, a blade 42 may be fabricated according to the illustrated method 530. The method 530 includes fabricating 532 the shear web 462, such as by laying-up and curing plies of pre-preg composite fibers as known in the art having the part geometry of the shear web 462 as described hereinabove. The shear web 462 is then placed 534 between the branches 416a, 416b, as described hereinabove. The blade skin 472 is then laid-up 536 around the inner mold 402 and shear web 462, as described hereinabove and in accordance with the method 320 for debulking ply allocations 180.

The combined blade skin 472 and shear web 462 are then cured 538. Curing 538 may include zoned heating according to distinct temperature progressions for each zone 418 according to the methods and apparatus disclosed herein, such as the method 320 and corresponding apparatus. The leading and trailing edge fairings 520a, 520b may be fabricated 540 and then secured 542 to the cured blade spar 440 by an adhesive or by co-curing, as described hereinabove.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for manufacturing a rotor blade comprising:
    placing an uncured composite blade spar having a non-uniform wall thickness between first and second molds, the first mold defining a first mold surface and the second mold comprising a rigid core and a heated layer secured thereto, the heated layer defining a second mold surface such that the uncured composite blade spar is positioned between the first and second mold surfaces, the second mold further comprising a plurality of heating elements embedded therein; and simultaneously activating the plurality of heating elements according to a plurality of different temperature progressions effective to cure portions of the uncured composite blade spar coextensive with each heating element of the plurality of heating elements, each temperature progression of the plurality of different temperature progressions being defined according to a thickness of a region of the composite blade spar over the heating element of the plurality of heating elements corresponding to the each temperature progression;

wherein the heated layer includes a thermally expandable material having a non-uniform thickness corresponding to pressure requirements for curing the composite blade spar in accordance with the non-uniform wall thickness;

wherein the plurality of different temperature progressions are effective to cause the thermally expandable material to apply non-uniform pressure to the uncured composite blade spar.

2. The method of claim 1, wherein the uncured composite blade spar is hollow such that one of the first mold surface and the second mold surface defines a contour of an outer surface of the uncured composite blade spar and the other of the first mold surface and second mold surface defines a contour of the inner surface of the uncured composite blade spar.

3. The method of claim 1, wherein:
the second mold surface defines the contour of the inner surface of the uncured composite blade spar; and
the second mold defines a root portion and first and second branch portions, the branch portions securing to the root portion and extending between the root portion and the distal end, the branch portions defining a gap therebetween.

4. The method of claim 3, wherein:
the first branch portion defines a first wall;
the second branch portion defines a second wall;
the first and second walls define the gap; and
the method further comprises placing a shear web between the first and second walls prior to placing the uncured composite blade spar between the first and second molds.

5. The method of claim 4, wherein the first and second walls have a helical contour.

6. The method of claim 4, wherein:
the shear web is pre-cured; and
the plurality of heating elements are positioned to be non-coextensive with the first and second walls.

7. The method of claim 1, wherein:
the uncured composite blade spar has a proximal end and a distal end; and
the non-uniform wall thickness decreases with distance from the proximal end.

8. The method of claim 1, further comprising:
securing a leading edge fairing and trailing edge fairing to opposing sides of the composite blade spar after curing the composite blade spar, the leading edge and trailing edge fairings extending along a major portion of the composite blade spar.

9. The method of claim 8, wherein securing the leading edge and trailing edge fairings to the composite blade spar comprises securing the leading edge and trailing edge fairings to the composite blade spar by means of adhesive.

10. The method of claim 8, wherein:
the uncured composite blade spar comprises a plurality of ply allocations; and
placing the uncured composite blade spar having the non-uniform wall thickness between the first and second molds comprises, for each ply allocation placing the ply allocation between the first and second molds, and debulking the ply allocation.

11. The method of claim 10, wherein debulking the ply allocation comprises applying both heat and pressure.

12. The method of claim 1, wherein a plurality of pressure sensors are embedded in the heated layer, the method further comprising:
controlling activation of the plurality of heating elements according to outputs of the plurality of pressure sensors.

13. The method of claim 12, further comprising:
controlling activation of the plurality of heating elements according to outputs of the plurality of pressure sensors such that the plurality of pressure sensors detect different pressures corresponding to desired pressures for a plurality of zones of the uncured composite blade spar in accordance with cure dynamics of the non-uniform wall thickness within the plurality of zones.

14. The method of claim 1, wherein the thermally expandable material has a non-uniform layer thickness across the plurality of heating elements effective to provide a desired non-uniform pressure in accordance with cure dynamics of the non-uniform wall thickness of the uncured composite blade when the plurality of heating elements are activated according to the plurality of different temperature progressions.

\* \* \* \* \*